US005858516A

United States Patent [19]

Ou-Yang

[11] Patent Number: 5,858,516

[45] Date of Patent: Jan. 12, 1999

[54] IMAGING MEDIUM COMPRISING POLYCARBONATE, METHOD OF MAKING, METHOD OF IMAGING, AND IMAGE-BEARING MEDIUM

[75] Inventor: David T. Ou-Yang, Woodbury, Minn.

[73] Assignee: Minnesota Mining & Manufacturing Company, St. Paul, Minn.

[21] Appl. No.: 846,398

[22] Filed: Apr. 30, 1997

[51] Int. Cl.[6] .......... B32B 3/00

[52] U.S. Cl. .......... 428/195; 428/211; 428/412; 428/537.5; 428/913; 428/914; 430/126

[58] Field of Search .......... 428/195, 412, 428/913, 914, 537.5, 211; 430/126, 124

[56] References Cited

U.S. PATENT DOCUMENTS

| | | | |
|---|---|---|---|
| Re. 24,906 | 12/1960 | Ulrich | 206/59 |
| 3,389,827 | 6/1968 | Abere et al. | 220/53 |
| 3,854,942 | 12/1974 | Akman | 96/1.2 |
| 3,949,148 | 4/1976 | Akman | 427/24 |
| 4,080,348 | 3/1978 | Korpman | 260/27 BB |
| 4,136,071 | 1/1979 | Korpman | 260/27 BB |
| 4,181,752 | 1/1980 | Martens et al. | 427/54.1 |
| 4,234,644 | 11/1980 | Blake et al. | 428/204 |
| 4,286,039 | 8/1981 | Landa et al. | 430/119 |
| 4,684,238 | 8/1987 | Till et al. | 355/10 |
| 4,792,584 | 12/1988 | Shiraki et al. | 524/77 |
| 4,794,651 | 12/1988 | Landa et al. | 430/110 |
| 4,833,179 | 5/1989 | Young et al. | 522/183 |
| 4,952,650 | 8/1990 | Young et al. | 526/194 |
| 5,028,964 | 7/1991 | Landa et al. | 355/273 |
| 5,047,306 | 9/1991 | Almog | 430/115 |
| 5,089,856 | 2/1992 | Landa et al. | 355/279 |
| 5,192,638 | 3/1993 | Landa et al. | 430/137 |
| 5,196,246 | 3/1993 | Kauss et al. | 428/39 |
| 5,242,888 | 9/1993 | Atherton et al. | 503/227 |
| 5,276,492 | 1/1994 | Landa et al. | 355/277 |
| 5,302,436 | 4/1994 | Miller | 428/195 |
| 5,380,611 | 1/1995 | Landa | 430/45 |
| 5,409,882 | 4/1995 | Minato et al. | 503/227 |
| 5,410,392 | 4/1995 | Landa | 355/271 |
| 5,504,129 | 4/1996 | Dandreaux et al. | 524/270 |
| 5,527,615 | 6/1996 | Kimura et al. | 428/421 |
| 5,545,459 | 8/1996 | Chang | 428/121 |
| 5,658,677 | 8/1997 | Ebisch et al. | 428/537.5 |

FOREIGN PATENT DOCUMENTS

| | | |
|---|---|---|
| 0 506 109 A1 | 3/1992 | European Pat. Off. . |

OTHER PUBLICATIONS

Brooks & Pirog, *Processing of Surlyn® Ionomer Resins by Blown and Cast Film Processes,* DuPont Company, Plastics Department, p. 18.

ASTM Standard "D–1238," Standard Test Method for Flow Rates of Thermoplastics by Extrusion Plastometer.

ASTM Test method Designation: D 4060–81, "Standard Test Method for Abrasion Resistance of Organic Coatings by the Taber Abraser," *1982 Annual Book of ASTM Standards,* Part 27, ASTM, Philadelphia, Pennsylvania, pp. 918–920.

*Polymer Degradation,* T. Kelen, Chapter 7, Van Nostrand Reinhold Comany, 1983.

*Polymer Degardation and Stability,* vol. 2, 1980, Applied Science Publishers, England, p. 203.

*Primary Examiner*—Elizabeth Evans
*Attorney, Agent, or Firm*—Janice L. Dowdall

[57] ABSTRACT

A polymeric imaging medium comprising a receptor layer and a polycarbonate backing layer particularly useful in electrophotographic printing processes with liquid toners comprising thermoplastic toner particles in a liquid carrier that is not a solvent for the particles at a first temperature and that is a solvent for the particles at a second temperature or with dry toner, making the imaging medium in the substantial absence of ultraviolet radiation, method of imaging, and such an imaged medium which contains ultraviolet light stabilizers.

47 Claims, 3 Drawing Sheets

IMAGING MEDIUM COMPRISING POLYCARBONATE, METHOD OF MAKING, METHOD OF IMAGING, AND IMAGE-BEARING MEDIUM

FIELD OF THE INVENTION

The present invention relates generally to an imaging medium. The present invention relates more particularly to an imaging medium comprising a particular receptor layer and a polycarbonate backing layer particularly useful in electrophotographic printing processes with liquid toners comprising thermoplastic toner particles in a liquid carrier that is not a solvent for the particles at a first temperature and that is a solvent for the particles at a second temperature and with dry toner; methods of imaging such a medium; and such an imaged medium.

The imaging medium, which can surprisingly be made in the substantial or complete absence of ultraviolet light radiation can thus optionally contain ultraviolet light sensitive components such as inhibitors and/or absorbers thus providing a final product which demonstrates resistance to ultraviolet light radiation (i.e., an imaged media that is much less likely to experience fading of its image in sunlight).

BACKGROUND OF THE INVENTION

Methods and apparatuses for electrophotographic printing are known. Electrophotographic printing generally includes imparting an image on a final receptor by forming a latent image on selectively charged areas of a photoconducter such as a charged drum, depositing a charged toner onto the charged areas of the photoconductor to thereby develop an image on the photoconductor, and transferring the developed toner from the charged drum under heat and/or pressure onto the final receptor. An optional transfer member can be located between the photoconductor and the final receptor. Examples of electrophotographic apparatuses and methods are disclosed in U.S. Pat. Nos. 5,276,492; 5,380,611; and 5,410,392. The '492 and '392 patents both disclose that a preferred toner is a liquid toner comprising carrier liquid and pigmented polymeric toner particles which are essentially non-soluble in the carrier liquid at room temperature, and which solvate in the carrier liquid at elevated temperatures. Examples of such liquid toners are disclosed in U.S. Pat. No. 4,794,651. The '492 patent and the '392 patent both disclose that the toner image can be transferred to a receiving substrate such as paper ('492 patent: column 7, lines 19–20; '392 patent: column 4, lines 57–58). While having their own utility, paper substrates are not desired for all applications and uses. The '611 patent discloses that the toner image can be transferred to a receiving substrate such as a transparency, without disclosing any particular composition of a transparency (column 4, lines 17).

It is also known that certain polymeric and ionomeric compositions are suitable for use with some printing methods and apparatuses. For example, flexographic printing on films made from SURLYN brand ionomeric resin, available from E. I. du Pont de Nemours & Company, Wilmington, Del. has been suggested. See Brooks & Pirog, *Processing of Surlyn® Ionomer Resins by Blown and Cast Film Processes*, p. 18, Du Pont Company, Plastics Department, Polyolefins Division, Technical Services Laboratory. U.S. Pat. No. 5,196,246 discloses a wall decorating system that, in one embodiment, includes a SURLYN blend film that can be printed by etching, embossing, flexographic printing, silk screening, or gravure processes (column 14, lines 16–19).

Conventional printing processes include flexographic, gravure, and screen printing. These processes require a long time to make printing patterns, such as printing plates or gravure cylinders. Furthermore, the printing equipment needed for such processes is rather expensive. Such printing processes are not practical for short run print-on-demand type printing.

Polycarbonate films are well known for their high impact resistance, good thermal moldability, and excellent lens-like clarity. Many types of products in the electronics, appliance, and automotive industries such as cellular phones, air conditioners, and automotive dial displays, etc. therefore use polycarbonate sheets as a graphic overlayer.

However, these polycarbonate graphic overlays are traditionally prepared with solvent based screen printing processes. These processes not only require a long time to make artwork and to prepare printing screens, but they are also less environmentally friendly. These products are not practical for short run print-on-demand type printing. Recently developed Indigo and Xeikon print processes, however, yield high quality images and are suitable for short run print on demand printing processes.

The commercially available durable product for electrophotographic digital imaging comprises an imageable modified PET, which is then modified by the application of a polycarbonate layer. In other words, a layer of polycarbonate previously could not be directly imaged with such methods. Instead a layer of modified PET was imaged and subsequently covered with a layer of polycarbonate. The polycarbonate (PC) was attached to the imaged PET with a layer of pressure sensitive adhesive. However, according to the present invention, a novel PC imaging medium has been provided which can be imaged directly using electrophotographic printing technology. The novel imaging medium of the invention not only requires fewer steps than the known product but also uses less raw material.

Short run, print-on-demand type printing is becoming increasingly popular. Printers capable of providing such short run print on demand printing include those developed by Indigo Ltd. and those developed by Xeikon N.V. The Indigo printers can employ electrophotographic liquid toner whereas the Xeikon printers employ dry toner.

Commercially available polycarbonate films which are untreated cannot be printed with an Indigo printer. A special solvent based polyamide coating (such as that available from Indigo Ltd. under the name Topaz) is usually required in order to yield acceptable printing with the Indigo printer. However, the image printed over such a coating typically exhibits poor Taber abrasion resistance (i.e., below 6).

Commercially available polycarbonate films can be readily printed with a Xeikon printer. However, the resultant images demonstrate inadequate Taber abrasion resistance (i.e., below 6).

SUMMARY OF THE INVENTION

What is desired is an imaging medium comprising polycarbonate that can be made in the substantial absence of ultraviolet radiation and thus can include ultraviolet light stabilizers such as inhibitors and/or absorbers wherein the media can readily be printed by short run electrophotographic methods and apparatuses to produce high quality images and that is strong, durable, and abrasion-resistant.

We have discovered such an imaging medium. The present invention provides imaging media comprising a particular receptor layer and a polycarbonate backing layer. The receptor layer utilized surprisingly demonstrates good adhesion to polycarbonate in the absence of ultraviolet ("UV") radiation application.

Heretofore, it was not known how to produce such an imaging medium in the absence of ultraviolet radiation. By discovering such a method and medium, components such as UV stabilizers can be included and not rendered useless by the manner of making the medium. Printing of such media results in imaged media which has highly desirable properties including resistance to fading on exposure to UV radiation due to the present discovery.

The imaging media of the present invention are particularly useful in electrophotographic printing processes with liquid toners comprising thermoplastic toner particles in a liquid carrier that is not a solvent for the particles at a first temperature and that is a solvent for the particles at a second temperature. The imaging media of the present invention are also particularly useful in electrophotographic printing processes employing dry toner (such as dry powder toner). The present invention also provides methods of imaging such imaging media, and such an imaged media.

One advantage of the present invention is that upon extruding a receptor layer on a polycarbonate backing, it is not necessary to heat the resulting structure or subject it to irradiation (such as ultraviolet light irradiation). Thus the formation of such imaging medium can take place in t he substantial or complete ultraviolet light radiation.

A first embodiment of the imaging medium of the invention is an imaging medium comprising:

(a) a receptor layer, wherein the receptor layer comprises:
  (I) a polymer(s) wherein each polymer independently comprises the polymerization product of a composition comprising (i) ethylene, (ii) monomer(s) selected from the group consisting of vinyl acetate, vinyl acrylate, and mixtures thereof, (iii) optionally a vinyl carboxylic acid(s), (iv) optionally an anhydride; and
  (II) 0 to about 3 percent by weight (typically about 0.05 to about 3 percent if used) by weight of an ultraviolet light stabilizer selected from the group consisting of ultraviolet light absorbers, ultraviolet light inhibitors, and mixtures thereof, based upon the total weight of the receptor layer;

wherein the receptor layer has a melt index of at least about 2.5 grams/10 minutes; and (b) a polycarbonate backing layer bonded to the receptor layer;

wherein the receptor layer is bonded to the backing layer in the substantial absence of ultraviolet radiation, and where in the composition of the receptor layer is selected such that the T-peel adhesion of the receptor layer to the polycarbonate backing layer is at least about 358 g/cm, and such that at least one of the following is true:
  (i) the Taber abrasion resistance test value for an image electrophotographically formed on the receptor layer with a liquid toner is at least about 6;
  (ii) the Taber abrasion resistance test value for an image electrophotographically formed on the receptor layer with a dry thermoplastic toner is at least about 6.

The present invention also provides a method of transferring an electrophotographically developed image from a photoconductor to an imaging medium wherein the toner employed is a liquid toner. The method comprises the steps of: a) selectively providing desired portions of a photoconductor with a developed image, the image comprising a plurality of thermoplastic toner particles in a liquid carrier at a first temperature, wherein the liquid carrier is not a solvent for the particles at the first temperature and wherein the thermoplastic particles and the liquid carrier form substantially a single phase at or above a second temperature; b) heating the developed image to a temperature at least as high as the second temperature to thereby form a single phase of the thermoplastic particles and liquid carrier; and c) thereafter transferring the developed image to the receptor layer of the imaging medium of the invention at a temperature of about 120° to about 165° C.

The present invention also provides a method of transferring an electrophotographically developed image from a photoconductor to an imaging medium, comprising the steps of:

a) selectively providing desired portions of a photoconductor with a developed image, the image comprising a plurality of dry thermoplastic toner particles wherein the toner particles are solid at a first temperature, but which soften or melt at or above a second temperature;

b) transferring the developed image onto a receptor layer of an imaging medium of the present invention;

c) heating and optionally applying pressure to the developed image such that it reaches a temperature at least as high as the second temperature to soften or melt the toner particles to form a final fixed image.

In another embodiment the present invention provides a method of making an imaging medium comprising the step of:

bonding a polycarbonate backing layer to a receptor layer in the substantial absence of ultraviolet light radiation, wherein the receptor layer comprises:

a polymer(s) wherein each polymer independently comprises the polymerization product of a composition comprising (i) ethylene, (ii) monomer(s) selected from the group consisting of vinyl acetate, vinyl acrylate, and mixtures thereof, (iii) optionally a vinyl carboxylic acid(s), (iv) optionally an anhydride;

wherein the receptor layer has a melt index of at least about 2.5 grams/10 minutes; and wherein the composition of the receptor layer is selected such that the T-peel adhesion of the receptor layer to the polycarbonate backing layer is at least about 358 g/cm, and such that at least one of the following is true:
  (i) the Taber abrasion resistance test value for an image formed on the receptor layer with a liquid toner is at least about 6;
  (ii) the Taber abrasion resistance test value for an image formed on the receptor layer with a solid toner is at least about 6.

The present invention also provides a method of transferring an electrophotographically developed image from a photoconductor to an imaging medium, comprising the steps of:

(a) selectively providing desired portions of a photoconductor with a developed image, the image comprising a plurality of thermoplastic toner particles in a liquid carrier at a first temperature, wherein the liquid carrier is not a solvent for the particles at the first temperature and wherein the thermoplastic particles and the liquid carrier form substantially a single phase at or above a second temperature;

(b) heating the developed image to a temperature at least as high as the second temperature to thereby form a single phase of the thermoplastic particles and liquid carrier; and (c) thereafter transferring the developed image to the receptor layer of an imaging medium at a temperature of about 120 to about 165° C.;

wherein the imaging medium is that described above.

The present invention also provides a method of transferring an electrophotographically developed image from a photoconductor to an imaging medium comprising the steps of:

(a) selectively providing desired portions of a photoconductor with a developed image, the image comprising a plurality of dry thermoplastic toner particles wherein the dry thermoplastic toner particles are solid at a first temperature, but which soften or melt at or above a second temperature;

(b) transferring the developed image onto a receptor layer of an imaging medium, wherein the imaging medium is that of described above;

(c) heating and optionally applying pressure to the developed image such that it reaches a temperature at least as high as the second temperature to soften or melt the toner particles to form a final fixed image.

The present invention also provides an imaged article. The imaged article comprises a receptor layer having an imaging surface (also referred to as an "imageable surface"), and an image on the imaging surface, the image typically comprising a substantially continuous layer. In one embodiment the layer of the image comprises the thermoplastic particles and a liquid carrier that is not a solvent for the particles at a first temperature and which is a solvent for the particles at or above a second temperature, the layer having been deposited onto the imaging surface while in substantially a single phase with a liquid carrier. The resultant image is at least 95% free, preferably at least 98% free, more preferably at least 99% free and most preferably 100% free of solvent. In another embodiment the layer of the image is formed from dry toner particles.

Thus in one embodiment the present invention provides an imaged article comprising:

(a) the imaging medium of the invention;

(b) an image on a surface of the receptor layer which is not bonded to the backing, wherein the image is formed from a composition comprising a plurality of thermoplastic toner particles in a liquid carrier at a first temperature, wherein the liquid carrier is not a solvent for the particles at the first temperature and wherein the thermoplastic particles and the liquid carrier form substantially a single phase at or above a second temperature.

The present invention also provides another embodiment of an imaged article comprising:

(a) the imaging medium of the invention;

(b) an image on a surface of the receptor layer which is not bonded to the backing, wherein the image is formed from a dry thermoplastic toner.

An imaging medium or imaged medium can be analyzed to determine whether it has experienced ultraviolet light degradation. This can be accomplished via electron spectroscopy for chemical analysis (ESCA). The following references discuss analysis for ultraviolet light degradation: *Polymer Degradation*, T. Kelen, Chapter 7 (1983); *Ultraviolet Light Induced Reactions in Polymers*, by S. S. Labana, American Chemical Society Symposium Series #25, (1976); and *Polymer Degradation and Stability*, Vol. 2, p 203, (1980); all incorporated in their entirety herein by reference.

The imaging media and imaged media of the invention are made in a manner such that they are free or substantially free of ultraviolet light degradation effects as determined by ESCA.

Definitions

Certain terms are used in the description and the claims that, while for the most part are well known, may require some explanation. It should be understood that the term "electrophotographic printing" refers to printing processes in which an image is imparted on a receptor by forming a latent image on selectively charged areas of a photoconducter such as a charged drum, depositing a charged toner onto the charged areas of the photoconductor to thereby develop an image on the photoconductor, and transferring the developed toner from the charged drum under heat and/or pressure onto an imaging medium. An optional transfer member can be located between the charged drum and the imaging medium. Examples of electrophotographic printing apparatuses are well known in the art and include, but are not limited to, the OMNIUS and E-1000 electrophotographic printers, available from Indigo, Ltd. of Rehovot, Israel; the DCP-1 printer available from Xeikon N.V. of Mortsel, Belgium; and the LANIER 6345 copier available from Lanier Worldwide, Inc. of Atlanta, Ga.

The term "in the substantial absence of ultraviolet radiation" as used herein means that an artificial source of ultraviolet radiation such as a UV generating lamp is not present. Very minor amounts of ultraviolet radiation may be present due to standard room lighting (such as fluorescent or incandescent lighting) or natural lighting. However, these amounts are insubstantial and would be less than about $10^{-1}$ watts/inch ($4\times10^{-4}$ watts/cm). Thus, bondings, etc. occurring in natural or standard room lighting would thus be considered to be in the substantial absence of ultraviolet radiation.

All parts percentages, ratios, etc. used herein are by weight unless indicated otherwise.

BRIEF DESCRIPTION OF THE DRAWINGS

The present invention will be further explained with reference to the appended Figures, wherein like structure is referred to by like numerals throughout the several views, and wherein.

DETAILED DESCRIPTION OF THE INVENTION

The present invention provides imaging media comprising a particular receptor layer and a polycarbonate backing layer which is made in the complete or substantial absence of UV radiation and thus can contain UV sensitive components. The imaging media of the present invention are particularly useful in electrophotographic printing processes with liquid toners comprising thermoplastic toner particles in a liquid carrier that is not a solvent for the particles at a first temperature and that is a solvent for the particles at a second temperature. The present invention also provides methods of making such imaging media, imaging such imaging media, and such an imaged media.

IMAGING MEDIUM

Figure 1A:
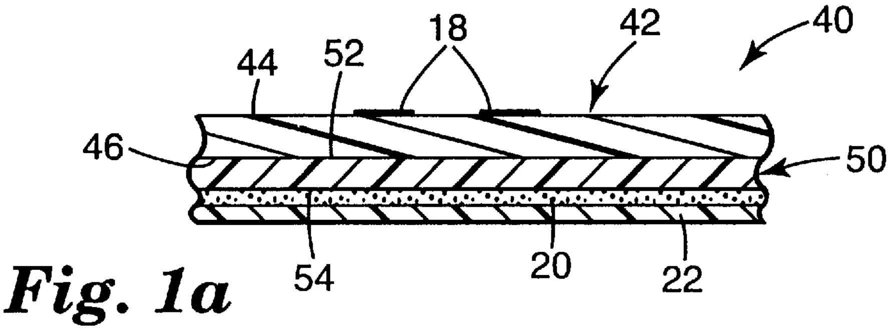
FIG. 1*a* is a cross-sectional view of a first embodiment of an imaging medium according to the present invention.

Referring now to FIG. 1*a*, there is illustrated a preferred embodiment of imaging medium 40. This embodiment includes receptor layer 42 joined to PC backing layer 50. Receptor layer 42 includes first major surface, or image surface 44, and second major surface, or back surface 46. Backing layer 50 includes first major surface 52 joined to the second surface 46 of the receptor layer. Backing layer also includes second major surface 54 opposite the first major surface 52. Optional layer of adhesive 20 may be provided on the second major surface 54 of the backing layer. When the adhesive layer is a pressure sensitive adhesive, then it is preferable to provide release liner 22. As shown in FIG. 1*a*, direct printed image 18 has been printed on imaging surface 44 as is discussed in detail below.

Figure 1B:
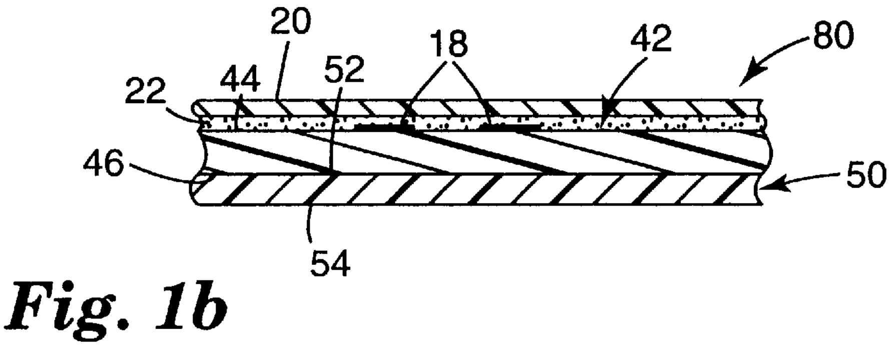
FIG. 1*b* is a cross-sectional view of a second embodiment of an imaging medium according to the present invention.

Referring now to FIG. 1*b*, there is illustrated a second preferred embodiment of imaging medium 80. This embodiment includes receptor layer 42joined to PC backing layer 50. Receptor layer 42 includes first major surface, or image surface 44, and second major surface, or back surface 46. Backing layer 50includes first major surface 52 joined to the second surface 46 of the receptor layer. Backing layer also includes second major surface 54 opposite the first major surface 52. Optional layer of adhesive 20 may be provided on the first major surface 44 of the receptor layer over reverse printed image 18. In this embodiment the backing layer 50 should be translucent or transparent, preferably transparent, and the receptor layer 42 should be translucent or transparent, preferably transparent, to allow observation of the image through the backing 50 and receptor layer 42. When the adhesive layer is a pressure sensitive adhesive, then it is preferable to provide release liner 22 over the adhesive layer 20.

The receptor layer 42 preferably comprises a polymer obtained by polymerizing ethylene with one or more monomers selected from the group consisting of vinyl acetate, esters of alkyl acrylic acid, esters of alkacrylic acid, and mixtures thereof and optional vinyl carboxylic acid(s) and optional anhydride(s). The receptor layer also includes ultraviolet light stabilizer(s).

Receptor layer materials useful in the present invention have a melt index of at least about 2.5 grams/10 minutes, preferably ranging from about 3.0 to 45 grams/10 minutes. Melt index is determined by following the procedures set forth in ASTM Standard "D-1238", "Standard Test Method for Flow Rates of Thermoplastics by Extrusion Plastometer", incorporated by reference herein, at 190° C.; 2.16 kg. Melt flow rate ("MFR") is determined the same as melt index except that the temperature is 230° C. and weight is 2.16 kg. Percent compositions set forth herein are percent by weight, unless otherwise specified.

Polymer(s)

Preferably the polymer(s) are selected from the group consisting of:

ethylene/vinyl acetate copolymers, each ethylene/vinyl acetate copolymer independently comprising about 52 to about 85 percent by weight ethylene and about 15 to about 48 weight percent vinyl acetate, based upon the total weight of the ethylene/vinyl acetate copolymer;

ethylene/vinyl acrylate copolymers, each ethylene/vinyl acrylate copolymer independently comprising about 60 to about 90 percent by weight ethylene and about 10 to about 40 weight percent vinyl acrylate, based upon the total weight of the ethylene/vinyl acrylate copolymer;

ethylene/vinyl carboxylic acid/vinyl acetate copolymers, each ethylene/vinyl carboxylic acid/vinyl acetate copolymer independently comprising about 37 to about 89 percent by weight ethylene, about 1 to about 15 weight percent vinyl carboxylic acid, and about 10 to about 48 percent by weight vinyl acetate based upon the total weight of the ethylene/vinyl carboxylic acid/vinyl acetate copolymer;

ethylene/vinyl carboxylic acid/vinyl acrylate copolymers, each ethylene/vinyl carboxylic acid/vinyl acrylate copolymer independently comprising about 45 to about 89 percent by weight ethylene, about 1 to about 15 weight percent vinyl carboxylic acid, and about 10 to about 40 percent by weight vinyl acrylate based upon the total weight of the ethylene/vinyl carboxylic acid/vinyl acrylate copolymer;

ethylene/anhydride/vinyl acetate copolymers, each ethylene/anhydride/vinyl acetate copolymer independently comprising about 37 to about 89.9 percent by weight ethylene, about 0.1 to about 15 weight percent anhydride, and about 10 to about 48 percent by weight vinyl acetate based upon the total weight of the ethylene/anhydride/vinyl acetate copolymer;

ethylene/anhydride/vinyl acrylate copolymers, each ethylene/anhydride/vinyl acrylate copolymer independently comprising about 45 to about 94.9 percent by weight ethylene, about 0.1 to about 15 weight percent anhydride, and about 5 to about 40 percent by weight vinyl acrylate based upon the total weight of the ethylene/anhydride/vinyl acrylate copolymer; and mixtures thereof.

More preferably the polymer(s) are selected from the group consisting of:

ethylene/vinyl acetate copolymers, each ethylene/vinyl acetate copolymer independently comprising about 60 to about 85 percent by weight ethylene and about 15 to about 40 weight percent vinyl acetate, based upon the total weight of the ethylene/vinyl acetate copolymer;

ethylene/vinyl acrylate copolymers, each ethylene/vinyl acrylate copolymer independently comprising about 70 to about 90 percent by weight ethylene and about 10 to about 30 weight percent vinyl acrylate, based upon the total weight of the ethylene/vinyl acrylate copolymer;

ethylene/vinyl carboxylic acid/vinyl acetate copolymers, each ethylene/vinyl carboxylic acid/vinyl acetate copolymer independently comprising about 48 to about 84 percent by weight ethylene, about 1 to about 12 weight percent vinyl carboxylic acid, and about 15 to about 40 percent by weight vinyl acetate based upon the total weight of the ethylene/vinyl carboxylic acid/vinyl acetate copolymer;

ethylene/vinyl carboxylic acid/vinyl acrylate copolymers, each ethylene/vinyl carboxylic acid/vinyl acrylate copolymer independently comprising about 52 to about 89 percent by weight ethylene, about 1 to about 12 weight percent vinyl carboxylic acid, and about 10 to about 30 percent by weight vinyl acrylate based upon the total weight of the ethylene/vinyl carboxylic acid/vinyl acrylate copolymer;

ethylene/anhydride/vinyl acetate copolymers, each ethylene/anhydride/vinyl acetate copolymer independently comprising about 42 to about 84.9 percent by weight ethylene, about 0.1 to about 12 weight percent anhydride, and about 15 to about 40 percent by weight vinyl acetate based upon the total weight of the ethylene/anhydride/vinyl acetate copolymer;

ethylene/anhydride/vinyl acrylate copolymers, each ethylene/anhydride/vinyl acrylate copolymer independently comprising about 52 to about 89.9 percent by weight ethylene, about 0.1 to about 12 weight percent anhydride, and about 10 to about 30 percent by weight vinyl acrylate based upon the total weight of the ethylene/anhydride/vinyl acrylate copolymer; and mixtures thereof.

Most preferably the polymer(s) are selected from the group consisting of ethylene/vinyl acetate copolymers, each ethylene/vinyl acetate copolymer independently comprising about 65 to about 82 percent by weight ethylene and about 18 to about 35 weight percent vinyl acetate, based upon the total weight of the ethylene/vinyl acetate copolymer;

ethylene/vinyl acrylate copolymers, each ethylene/vinyl acrylate copolymer independently comprising about 75 to about 85 percent by weight ethylene and about 15 to about 25 weight percent vinyl acrylate, based upon the total weight of the ethylene/vinyl acrylate copolymer;

ethylene/vinyl carboxylic acid/vinyl acetate copolymers, each ethylene/vinyl carboxylic acid/vinyl acetate copolymer independently comprising about 55 to about 81 percent by weight ethylene, about 1 to about 10 weight percent vinyl carboxylic acid, and about 18 to about 35 percent by weight vinyl acetate based upon the total weight of the ethylene/vinyl carboxylic acid/vinyl acetate copolymer;

ethylene/vinyl carboxylic acid/vinyl acrylate copolymers, each ethylene/vinyl carboxylic acid/vinyl acrylate copolymer independently comprising about 65 to about 83 percent by weight ethylene, about 2 to about 10 weight percent vinyl carboxylic acid, and about 15 to about 25 percent by weight vinyl acrylate based upon the total weight of the ethylene/vinyl carboxylic acid/vinyl acrylate copolymer;

ethylene/anhydride/vinyl acetate copolymers, each ethylene/anhydride/vinyl acetate copolymer independently comprising about 55 to about 81.5 percent by weight ethylene, about 0.5 to about 10 weight percent anhydride, and about 18 to about 35 percent by weight vinyl acetate based upon the total weight of the ethylene/anhydride/vinyl acetate copolymer;

ethylene/anhydride/vinyl acrylate copolymers, each ethylene/anhydride/vinyl acrylate copolymer independently comprising about 65 to about 84 percent by weight ethylene, about 1 to about 10 weight percent anhydride, and about 15 to about 25 percent by weight vinyl acrylate based upon the total weight of the ethylene/anhydride/vinyl acrylate copolymer; and mixtures thereof.

Optionally, the polymer(s) which make up the receptor layer may be modified by the incorporation of anhydrides (e.g., maleic anhydride) or acid (e.g., methacrylic acid) into the polymer. Optionally, those polymer(s) modified with acid may be partially neutralized by the addition of a metal cation (such as zinc, sodium, potassium or magnesium), thus forming ionomers. Alternatively, blends of polymer(s) may be formed and used by mixing together two or more of the above polymers.

When vinyl carboxylic acid is included in the polymer(s), it is preferably selected from the group consisting of acrylic acid, methacrylic acid, and mixtures thereof.

When the polymer(s) includes an anhydride it is preferably included in an amount of at least about 0.1% by weight based upon the total weight of the polymer(s).

In a preferred embodiment, the polymer(s) comprise methacrylic acid in an amount of at least about 1%, preferably at least about 2% by weight based upon the total weight of the polymer(s).

In one preferred embodiment, the polymer comprises an ethylene vinyl acetate ("EVA") copolymer. (It may, for example, comprise two monomers, three monomers, etc.). Typically the EVA has a vinyl acetate ("VA") content of at least about 15% by weight, preferably about 15% to about 40% by weight, and more preferably about 18% to about 35% by weight and a melt index of about 2.5 grams/10 minutes. One example of a preferred copolymer is ELVAX 3175 commercially available from E. I. du Pont de Nemours & Company, Wilmington, Del. ("du Pont") and has a melt index of approximately 6.0 grams/10 minutes and a vinyl acetate content of about 28%. If the receptor layer comprises an EVA modified with acid, for example methacrylic acid, it typically comprises at least about 1 percent by weight acid, preferably about 1% to about 12% by weight acid. One example of such a terpolymer is ELVAX 4260 commercially available from du Pont which has a melt index of approximately 6.0 grams/10 minutes, a vinyl acetate content of approximately 28%, and a methacrylic acid content of approximately 1.0%. If the polymer comprises an EVA modified with anhydride, it preferably comprises at least about 0.1% anhydride, such as maleic anhydride. One example of such a terpolymer is "MODIC E-300-K" available commercially from Mitsubishi Petroleum Co., Ltd. of Japan. Polymers having a vinyl acetate content below about 15% by weight tend to have poor printability characteristics; and polymers having a vinyl acetate content above about 35% by weight tend to be sticky and less practical to use in the extrusion and printing processes.

In another preferred embodiment, the polymer comprises an ethylene/vinyl acrylate copolymer, the vinyl acrylate comprising, for example, vinyl alkyl acrylates such as vinyl methyl acrylate, vinyl ethyl acrylate, vinyl propyl acrylate, vinyl n-butyl acrylate, vinyl n-pentyl acrylate, vinyl n-hexyl acrylate, and other acrylates such as vinyl alkacrylates such as vinyl methacrylate, vinyl ethacrylate, vinyl propacrylate, vinyl butacrylate, vinyl pentacrylate, vinyl hexacrylate, and mixtures thereof.

In a preferred embodiment the polymer(s) comprises ethylene/vinyl acrylate polymer(s), having a melt index of at least about 2.5 grams/10 minutes and a vinyl acrylate content of from about 10 to about 30% by weight.

If the polymer comprises an ethylene/vinyl acrylate terpolymer having acid, for example methacrylic acid incorporated therein, comprises at least about 1% acid, preferably about 1% to about 12% by weight acid. One example of such a terpolymer is "BYNEL CXA 2002" from du Pont, a terpolymer comprising ethylene, n-butylacrylate, and methacrylic acid having a melt index of approximately 10.0 grams/10 minutes, a methacrylic acid content of about 10%, and an n-butylacrylate content of about 10%.

Thus a preferred polymer(s) comprise the polymerization product of a composition comprising ethylene, vinyl acrylate, and methacrylic acid, the polymer(s) having a melt index of at least about 2.5 grams/10 minutes, wherein the vinyl acrylate content is about 10 to about 30 percent by weight and the acid content is about 1 to about 12 percent by weight based upon the total weight of the polymer(s).

If the polymer comprises an ethylene vinyl acrylate anhydride terpolymer, it preferably comprises at least about 0.1% anhydride, such as maleic anhydride. The acrylate content is preferably about 10 to about 30%.

Additive Polymer(s)

An additive polymer component may optionally be included in the receptor layer in combination with the required polymer component. Examples of such additive polymers include ethylene/vinyl carboxylic acid copolymers and/or its neutralized derivatives such as ionomers. Such additive polymer(s) would be used at about 0 to about 35 percent by weight, typically about 1 to about 35 percent by weight) based on the total weight of the receptor layer.

Ultraviolet Light Stabilizers

The receptor layer may optionally further comprise ultraviolet light stabilizer(s). A variety of ultraviolet light stabilizers are useful according to the present invention. One class of such components are ultraviolet light absorbers. These materials typically function by absorbing harmful ultraviolet radiation and dissipating it as heat energy. Examples of such materials include but are not limited to those selected from the group consisting of benzotriazoles (such as Tinuvin 328 and Tinuvin 900, available from Ciba-Geigy Corporation, New York), benzophenones (such as Sandover 3041 available from Clariant Corporation, Charlotte, N.C.), and oxalanilides (such as Sandover VSU, available from Clariant Corporation) and triazines such as that available as Cyagard UV-1164 from Cytec Industries Inc., New Jersey.

Another class of such components are ultraviolet light inhibitors. These materials typically trap free radicals with subsequent regeneration of active stabilizer moieties, energy transfer, and peroxide decomposition. Examples of such materials include but are not limited to those selected from the group consisting of hindered amines (such as Tinuvin 292 and Tinuvin 144, both from Ciba-Geigy Corporation).

Preferably both ultraviolet light absorber and ultraviolet light inhibitor are present in the receptor layer at a weight ratio of ultraviolet light absorber to ultraviolet light inhibitor of about 1:3 to about 3:1, more preferably about 1.5:2.5 to about 2.5:1.5.

Preferably the receptor layer comprises about 0.1 to about 3 percent by weight of a component selected from the group consisting of ultraviolet light absorber, ultraviolet light inhibitor, and mixtures thereof, based on the total weight of the receptor layer, more preferably about 0.3 to about 1.5 percent by weight and most preferably about 0.5 to about 1 percent by weight.

Receptor Layer Thickness

The thickness of the receptor layer 42 is not necessarily critical, but it is preferably from about 0.0075 to about 0.25 mm (about 0.3 to about 10 mils), more preferably from about 0.013 to about 0.13 mm (about 0.5 to about 5 mils). The desired thickness is determined by the intended use of the film and desired characteristics of the imaging medium affecting handling and cutting.

To produce the receptor layer 42 of this invention, pellets or powder of resin along with optional resins or additives, as obtained from the manufacturer, are mixed together with the optional ultraviolet light absorber(s) and/or optional inhibitor(s), melted, and extruded to form a film. The film can be extruded onto the PC backing layer 50 as described in detail below.

Polycarbonate Backing

The backing layer 50 comprises polycarbonate (PC). The backing layer 50 may be transparent, colorless, pigmented, or metallized. Opaque, white backing layers are useful for this invention and typically are achieved by the addition to the polymer of conventional pigmenting agents such as titania, calcium carbonate, and talc. Metallized backing layers are also useful and typically are prepared by vapor coating aluminum onto the polymer. Such pigmented or metallized backing layers are particularly preferred when the receptor layer is transparent, or nearly so. In such a construction, the backing layer when bonded to the receptor layer provides an opaque imaging medium which is desirable for many print applications. Such a construction also makes it unnecessary to add pigmenting additives to the receptor layer itself Such additives may adversely affect the durability of the printed image on the receptor layer. It is also within the scope of the invention to use a transparent imaging medium. The thickness of the backing layer is preferably from about 0.00025 to 0.025 cm (0.0001 to 0.01 inches), and more preferably about 0.013 to 0.13 cm (0.0005 to 0.005 inches). When an opaque backing is desired it preferably has an optical density of 2.5±10% as measured on a MacBeth TD927 densitometer, available from Macbeth of Newburgh, N.Y.

Additives

Additives such as processing aids (e.g., slip agents) can optionally be included in the receptor layer. However, the amount of such additive(s) should be such that the requisite properties of the imaging medium of the invention are retained.

Attachment of Receptor Layer to the Backing

The receptor layer 42 can be bonded (such as by adhesion, for example) to the polycarbonate backing layer 50 by a number of techniques. Suitable joining means include pressure sensitive adhesives, heat activated adhesives, sonic welding, and the like. In one preferred embodiment of imaging medium 40, the receptor layer 42 is extruded on to the backing layer 50 to form a composite structure. The material of the receptor layer 42 is coated onto the backing layer 50 in a molten state by a conventional extrusion process. The temperature of the material of the receptor layer, when in the extruder, typically ranges from about 250° F. (121° C.) to about 480° F. (249° C.). The temperature of the material of the receptor layer 42 as it exits the extruder is typically from about 350° F. (177° C.) to about 560° F. (293° C.). After the material is extruded onto the backing layer, the thus-formed composite structure can be allowed to cool.

In a preferred embodiment, a blend of a polymer component comprising a copolymer comprising ethylene and vinyl acetate commercially available under the trade designation "ELVAX 3175" from du Pont and the other components (ultraviolet absorber and/or inhibitor, etc.) is extruded at a thickness of about 0.025 mm (1 mil) onto a PC backing layer approximately 0.254 mm (10 mil) thick.

A preferred embodiment of imaging medium 40 can be prepared by extruding a 0.038 mm (1.5 mil) thick receptor layer 42 comprising a blend of ethylene copolymer with the other component(s) onto at least about a 0.025 cm (1 mil) thick polycarbonate backing layer 50, allowing the thus-formed composite structure to cool.

In a preferred embodiment, an ethylene/vinyl acrylate/vinyl carboxylic acid copolymer such as a terpolymer comprising ethylene, n-butylacrylate, and methacrylic acid (EAMA) commercially available under the trade designation "BYNEL CXA 2002" from du Pont is extruded as a blend with the ethylene/vinyl acetate copolymer and/or ethylene vinyl acrylate and ultraviolet light stabilizer(s) at a thickness of about 0.254 mm (1 mil) (0.001 inches) onto a polycarbonate backing layer approximately 0.254 mm (1 mil) (0.00056 inches) thick.

Adhesives

Adhesives useful in the preparation of an adhesive coated imaging medium according to the present invention include both pressure sensitive and non-pressure sensitive adhesives such as hot melt and curable adhesives. Pressure sensitive adhesives are normally tacky at room temperature and can be adhered to a surface by application of, at most, light finger pressure, while non-pressure sensitive adhesives include solvent, heat, or radiation activated adhesive systems. Pressure sensitive adhesives are a preferred class of adhesives for use in the present invention. Examples of adhesives useful in the invention include those based on general compositions of polyacrylate; polyvinyl ether; diene-containing rubber such as natural rubber, polyisoprene, and polyisobutylene; polychloroprene; butyl rubber; butadiene-acrylonitrile polymer; thermoplastic elastomer; block copolymers such as styrene-isoprene and styrene-isoprene-styrene block copolymers, ethylene-propylene-diene polymers, and styrene-butadiene polymer; poly-alpha-olefin; amorphous polyolefin; silicone; ethylene-containing copolymer such as ethylene vinyl acetate, ethylacrylate, and ethyl methacrylate; polyurethane; polyamide; epoxy; polyvinylpyrrolidone and vinylpyrrolidone copolymers; polyesters; and mixtures of the above. Additionally, the adhesives can contain additives such as tackifiers, plasticizers, fillers, antioxidants, stabilizers, pigments, diffusing particles,curatives, and solvents.

A general description of useful pressure sensitive adhesives may be found in *Encyclopedia of Polymer Science and Engineering*, Vol. 13, Wiley-Interscience Publishers (New York, 1988). Additional description of useful pressure sensitive adhesives may be found in *Encyclopedia of Polymer Science and Technology*, Vol. 1, Interscience Publishers (New York, 1964).

Other pressure sensitive adhesives useful in the invention are described in the patent literature. Examples of these patents include Re 24,906 (Ulrich), U.S. Pat. No. 3,389,827 (Abere et al.), at Col. 4-Col. 5, U.S. Pat. No. 4,080,348 (Korpman), U.S. Pat. No. 4,136,071 (Korpman), U.S. Pat. No. 4,181,752 (Martens et al.), U.S. Pat. No. 4,792,584 (Shiraki et al.), U.S. Pat. No. 4,883,179 (Young et al.), and U.S. Pat. No. 4,952,650 (Young et al.). Commercially available adhesives are also useful in the invention. Examples include those adhesives available from 3M Company, St. Paul, Minn.; H. B. Fuller Company, St. Paul, Minn.; Century Adhesives Corporation, Columbus, Ohio; National Starch and Chemical Corporation, Bridgewater, N.J.; Rohm and Haas Company, Philadelphia, Pa.; and Air Products and Chemicals, Inc., Allentown, Pa.

Toners

Liquid Toners

Liquid toners typically comprise pigments, binder, carrier solvent, dispersing agents, and charge additives. Preferably, the liquid toner comprises thermoplastic toner particles in a liquid carrier that is not a solvent for the particles at a first temperature and that is a solvent for the particles at a second temperature, especially those disclosed in U.S. Pat. No. 5,192,638, "Toner for Use in Compositions for Developing Latent Electrostatic Images, Method of Making the Same, and Liquid Composition Using the Improved Toner" (Landa et al.), the entire disclosure of which is incorporated herein by reference. Landa et al. '638 discloses a liquid composition for developing latent electrostatic images comprising toner particles associated with a pigment dispersed in a nonpolar liquid. The toner particles are formed with a plurality of fibers or tendrils from a thermoplastic polymer and carry a charge of a polarity opposite to the polarity of the latent electrostatic image. The polymer is insoluble or insolvatable in the dispersant liquid at room temperature. The toner particles are formed by plasticizing the polymer and pigment at elevated temperature and then either permitting a sponge to form and wet-grinding pieces of the sponge or diluting the plasticized polymer-pigment while cooling and constantly stirring to prevent the forming of a sponge while cooling. When cool, the diluted composition will have a concentration of toner particles formed with a plurality of fibers.

These fibers are formed from a thermoplastic polymer and are such that they may interdigitate, intertwine, or interlink physically in an image developed with a developing liquid through which has been dispersed the toner particles of the instant invention. The result is an image on the photoconductor having good sharpness, line acuity—that is, edge acuity—and a high degree of resolution. The developed image on the photoconductor has good compressive strength, so that it may be transferred from the surface on which it is developed to the imaging medium without squash. The intertwining of the toner particle permits building a thicker image and still obtaining sharpness. The thickness can be controlled by varying the charge potential on the photoconductor, by varying the development time, by varying the toner-particle concentration, by varying the conductivity of the toner particles, by varying the charge characteristics of the toner particles, by varying the particle size, or by varying the surface chemistry of the particles. Any or a combination of these methods may be used.

In addition to being thermoplastic and being able to form fibers as above defined, the polymer used in the particles of Landa et al. '683 preferably has the following characteristics: it is able to disperse a pigment (if a pigment is desired); it is insoluble in the dispersant liquid at temperatures below 40° C., so that it will not dissolve or solvate in storage; it is able to solvate at temperatures above 50° C.; it is able to be ground to form particles between 0.1 micron and 5 microns in diameter; it is able to form a particle of less than 10 microns; it is able to fuse at temperatures in excess of 70° C.; by solvation, the polymers forming the toner particles will become swollen or gelatinous. This indicates the formation of complexes by the combination of the molecules of the polymer with the molecules of the dispersant liquid.

Landa et al. '683 discloses three methods of forming toner particles having the desired fibrous morphology. The first method briefly includes dispersing or dissolving pigment particles in a plasticized polymer at temperatures between 65° C. and 100° C. The plasticized material when cooled has the form of a sponge. The sponge is then broken into smaller pieces and ground. Another method includes dissolving one or more polymers in a nonpolar dispersant, together with particles of a pigment such as carbon black or the like. The solution is allowed to cool slowly while stirring, which is an essential step in this method of forming the fiber-bearing toner particles. As the solution cools, precipitation occurs, and the precipitated particles will be found to have fibers extending therefrom. A third method is to heat a polymer above its melting point and disperse a pigment through it. In this method, fibers are formed by pulling the pigmented thermoplastic polymer apart without first forming a sponge. The fibrous toner particles, formed by any of the foregoing methods, are dispersed in a nonpolar carrier liquid, together with a charge director known to the art, to form a developing composition.

Landa et al. '683 discloses a toner particle formed with a plurality of fibers—that is to say, one with such morphology. Such a toner particle enables forming a developing composition for developing latent electrostatic images by dispersing the toner particles in small amounts in a nonpolar liquid such as an ISOPAR. The weight of the toner particle may be as low as 0.2 percent by weight of the weight of the dispersant liquid. The toner particle is pigmented and formed of a polymeric resin. A charge director is added to the composition in small amounts, which may be as low as one-tenth percent by weight of the weight of the toner particles in the developing composition. The charge director may be selected to impart either a positive or a negative charge to the toner particles, depending on the charge of the latent image. Those in the art will understand that the charge on the toner particles is generally opposite in polarity to that carried by the latent electrostatic image.

In Landa et al. '683, the nonpolar dispersant liquids are, preferably, branched-chain aliphatic hydrocarbons-more particularly, ISOPAR-G, ISOPAR-H, ISOPAR-K, ISOPAR-L, and ISOPAR-M. These ISOPARs are narrow cuts of isoparaffinic hydrocarbon fractions with extremely high levels of purity. For example, the boiling range of ISOPAR-G is between 156° C. and 176° C. ISOPAR-L has a mid-boiling point of approximately 194° C. ISOPAR-M has a flash point of 77° C. and an auto-ignition temperature of 338° C. They are all manufactured by the Exxon Corporation. Light mineral oils, such as MARCOL 52 or MARCOL 62, manufactured by the Humble Oil and Refining Company, may be used. These are higher boiling aliphatic hydrocarbon liquids.

The polymers used in Landa et al. '683 are thermoplastic, and the preferred polymers are known as ELVAX II, manufactured by du Pont, including resin numbers 5550; 5610; 5640; 5650T; 5720; and 5950. The original ELVAX resins (EVA) were the ethylene vinyl acetate copolymers. The new family of ELVAX resins, designated ELVAX II are ethylene copolymers combining carboxylic acid functionality, high molecular weight, and thermal stability. The preferred ethylene copolymer resins of Landa et al. '683 are the ELVAX II 5720 and 5610. Other polymers which are usable are the original ELVAX copolymers and polybutyl terephthalate. Still other useful polymers made by Union Carbide are the DQDA 6479 Natural 7 and DQDA 6832 Natural 7. These are ethylene vinyl acetate resins. Other useful polymers are NUCREL ethylene acrylic acid copolymers available from du Pont.

Landa et al. '683 also discloses that another useful class of polymers in making the particles are those manufactured by du Pont and sold under the trademark ELVACITE. These are methacrylate resins, such as polybutyl methacrylate (Grade 2044), polyethyl methacrylate (Grade 2028), and polymethyl methacrylate (Grade 2041). If desired, a minor amount of carnauba wax may be added to the composition. However, this tends to produce bleed-through and an oil fringe on the copy and is not preferred. Furthermore, if a hard polymer such as 5650T is used, a minor amount of hydroxy-ethyl cellulose may be added. This is not preferred.

The polymers of Landa et al. '683 are normally pigmented so as to render the latent image visible, though this need not be done in some applications. The pigment may be present in the amount of 10 percent to 35 percent by weight in respect of the weight of the polymer, if the pigment be Cabot Mogul L (black pigment). If the pigment is a dye, it may be present in an amount of between 3 percent and 25 percent by weight in respect of the weight of the polymer. If no dye is used—as, for example, in making a toner for developing a latent image for a printing plate—an amount of silica such as CABOSIL may be added to make the grinding easier. Examples of pigments are Monastral Blue G (C.I. Pigment Blue 15 C.I. No. 74160), Toluidine Red Y (C.I. Pigment Red 3), Quindo Magenta (Pigment Red 122), Indo Brilliant Scarlet Toner (Pigment Red 123, C.I. No. 71145), Toluidine Red B (C.I. Pigment Red 3), Watchung Red B (C.I. Pigment Red 48), Permanent Rubine F6B13-1731 (Pigment Red 184), Hansa Yellow (Pigment Yellow 98), Dalamar Yellow (Pigment Yellow 74, C.I. No. 11741), Toluidine Yellow G (C.I. Pigment Yellow 1), Monastral Blue B (C.I. Pigment Blue 15), Monastral Green B (C.I. Pigment Green 7), Pigment Scarlet (C.I. Pigment Red 60), Auric Brown (C.I. Pigment Brown 6), Monastral Green G (Pigment Green 7), Carbon Black, and Stirling NS N 774 (Pigment Black 7, C.I. No. 77266).

Landa et al '683 also discloses that a finely ground ferromagnetic material may be used as a pigment. About 40 percent to about 80 percent by weight of Mapico Black is preferred, with about 65 percent Mapico Black being optimum, other suitable materials such as metals including iron, cobalt, nickel, various magnetic oxides including $Fe_2O_3$, $Fe_3O_4$, and other magnetic oxides; certain ferrites such as zinc, cadmium, barium, manganese; chromium dioxide; various of the permalloys and other alloys such as cobalt-phosphorus, cobalt-nickel, and the like; or mixtures of any of these may be used.

Landa et al. '683 theorizes that, in dispersion, all of the toner particles have the same polarity of charge. When the particles approach each other, they are repelled, owing to the fact that each possesses a charge of the same polarity. When the latent electrostatic image is developed, the toner particles are impelled to go to the latent electrostatic image, which has a higher potential and a charge of opposite polarity. This forces the toner particles to associate with each other and to mat or interdigitate. The fact that the toner particles in the developed image are matted enables a more complete transfer from the photoconductor to be made to the carrier sheet. The matting also prevents spreading of the edges of the image and thus preserves its acuity. The small diameter of the toner particles ensures good resolution, along with the other results outlined above.

It is known that to impart a negative charge to the particles, such charge directors as magnesium petronate, magnesium sulfonate, calcium petronate, calcium sulfonate, barium petronate, barium sulfonate, or the like, may be used. The negatively charged particles are used to develop images carrying a positive charge, as is the case with a selenium-based photoconductor. With a cadmium-based photoconductor, the latent image carries a negative charge and the toner particles must therefore be positively charged. A positive charge can be imparted to the toner particles with a charge director such as aluminum stearate. The amount of charge director added depends on the composition used and can be determined empirically by adding various amounts to samples of the developing liquid.

Figure 3:
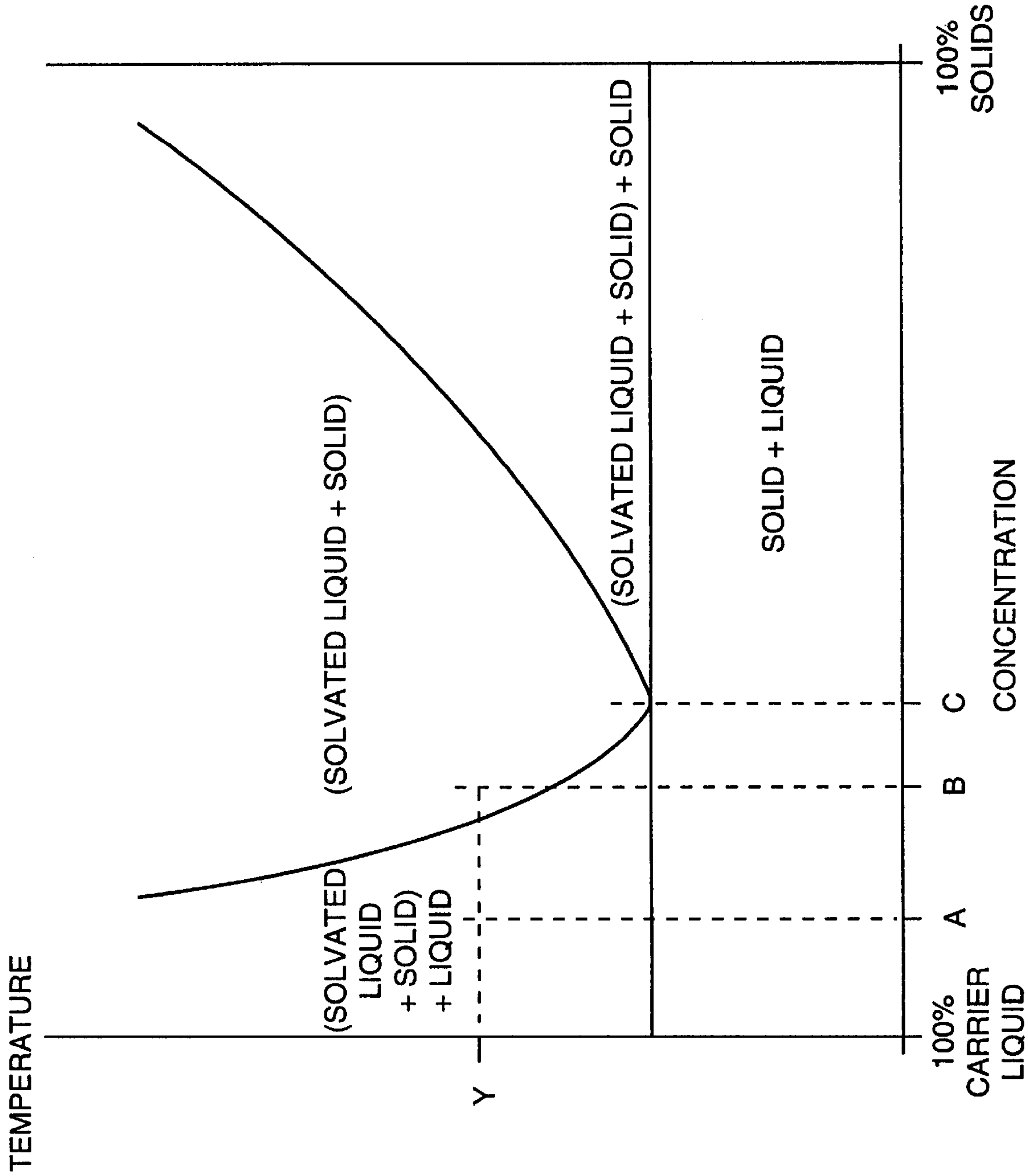
FIG. 3 is part of a simplified typical phase diagram for a preferred toner for use with the present invention.

The invention can be practiced using a variety of toner types but is especially useful for toners comprising carrier liquid and pigmented polymeric toner particles which are essentially non-soluble in the carrier liquid at room temperature, and which solvate carrier liquid at elevated temperatures. This is a characteristic of the toner of Example 1 of U.S. Pat. No. 4,794,651, previously incorporated by reference. Part of a simplified phase diagram of a typical toner of this type is shown in FIG. 3. This diagram represents the states of the polymer portion of the toner particles and the carrier liquid. The pigment in the particles generally takes little part in the process, and references herein to "single phase" and to "solvation" refer to the state of the polymer part of the toner particles together with the carrier liquid. In a preferred embodiment, the toner is prepared by mixing 10 parts of ELVAX II 5950 ethylene vinyl acetate copolymer (from E. I. du Pont) and 5 parts by weight of ISOPAR L (Exxon) diluent which is not a solvent for the ELVAX II 5950 at room temperature. The mixing is performed at low speed in a jacketed double planetary mixer connected to an oil heating unit for one hour, the heating unit being set at 130° C. A mixture of 2.5 parts by weight of Mogul L carbon black (Cabot) and 5 parts by weight of ISOPAR L is then added to the mix in the double planetary mixer and the resultant mixture is further mixed for one hour at high speed. 20 parts by weight of ISOPAR L pre-heated to 110° C. are added to the mixer and mixing is continued at high speed for one hour. The heating unit is disconnected and mixing is continued until the temperature of the mixture drops to 40° C. 100 g of the resulting material is mixed with 120 g of ISOPAR L and the mixture is milled for 19 hours in an attritor to obtain a dispersion of particles. The material is dispersed in ISOPAR L to a solids content of 1.5% by weight. The preferred liquid developer prepared comprises toner particles which are formed with a plurality of fibrous extensions or tendrils as described above. The preferred toner is characterized in that when the concentration of toner particles is increased above 20%, the viscosity of the material increases greatly, apparently in approximately an exponential manner. A charge director, prepared in accordance with the Example of U.S. Pat. No. 5,047,306, "Humidity Tolerant Charge Director Compositions" (Almog), the entire disclosure of which is incorporated herein by reference, is preferably added to the dispersion in an amount equal to about 3% of the weight of the solids in the developer.

Another preferred toner for use with the present invention are commercially known as ELECTROINK for E-PRINT 1000 manufactured by Indigo Ltd. of Rehovot, Israel.

Preferably the thermoplastic toner particles are selected from the group consisting of ethylene vinyl acrylate copolymers, ethylene vinyl acetate copolymers, ethylene acrylic acid copolymers, ionomers of ethylene acrylic acid copolymers, and mixtures thereof.

Dry Toners

Dry thermoplastic toners are also useful according to this present invention. Examples of useful dry toners include but are not limited to those selected from the group consisting of polyester toners (such as those available from Xeikon N.V.). It is theorized that other dry toners would be useful according to the present invention such as styrene/acrylate copolymer available from Lanier Worldwide, Inc.

Imaging Methods and Apparatus

In electrophotographic processes, an electrostatic image may be produced by providing a photoconductive layer, such as on a rotating drum, with a uniform electrostatic charge and thereafter selectively discharging the electrostatic charge by exposing it to a modulated beam of radiant energy. It will be understood that other methods may be employed to form an electrostatic image, such, for example, as providing a carrier with a dielectric surface and transferring a preformed electrostatic charge to the surface. The charge may be formed from an array of styluses. A latent image is thus formed on the charged drum. Charged toner is deposited on the charged areas of the drum, and the toner is then transferred under heat and/or pressure to the imaging medium 40. Images may be printed on imaging medium 40 using direct image printing or reverse image printing. Preferably, the toner can be transferred in an intermediate step to a transfer member between the charged drum and the imaging medium.

While the present invention can be advantageously used with many known electrophotographic methods and apparatuses, a particularly preferred apparatus and method is disclosed in U.S. Pat. No. 5,276,492, "Imaging Method and Apparatus" (Landa et al.), the entire disclosure of which is incorporated herein by reference.

In a preferred embodiment of the invention, a liquid toner image is transferred from an image forming surface to an intermediate transfer member for subsequent transfer to a final substrate. The liquid toner image includes a liquid portion including carrier liquid and a solids portion including pigmented polymeric toner particles which are essentially non-soluble in the carrier liquid at room temperature, and the polymer portion of which forms substantially a single phase with carrier liquid at elevated temperatures. The preferred imaging method generally includes the steps of concentrating the liquid toner image to a given non-volatile solids percentage by compacting the solids portion thereof and removing carrier liquid therefrom; transferring the liquid toner image to an intermediate transfer member; heating the liquid toner image on the intermediate transfer member to a temperature at least as high as that at which the polymer portion of the toner particles and the carrier liquid form substantially a single phase at the given solids percentage; and transferring the heated liquid toner image to a final substrate.

Liquid toner images are developed by varying the density of pigmented solids in a developer material on a latent image bearing surface in accordance with an imaged pattern. The variations in density are produced by the corresponding pattern of electric fields extending outward from the latent image bearing surface. The fields are produced by the different latent image and background voltages on the latent image bearing surface and a voltage on a developer plate or roller. In general, developed liquid toner images comprise carrier liquid and toner particles and are not homogeneous.

To improve transfer of a developed image from the latent image bearing surface to a substrate, it is most desirable to ensure that, before transfer, the pigmented solids adjacent background regions are substantially removed and that the density of pigmented solids in the developed image is increased, thereby compacting or rigidizing the developed image. Compacting or rigidizing of the developed image increases the image viscosity and enhances the ability of the image to maintain its integrity under the stresses encountered during image transfer. It is also desirable that excess liquid be removed from the latent image bearing surface before transfer.

Many methods are known to remove the carrier liquid and pigmented solids in the region beyond the outer edge of the image and thus leave relatively clean areas above the background. The technique of removing carrier liquid is known generally as metering. Known methods include employing a reverse roller spaced about 50 microns from the latent image bearing surface, an air knife, and corona discharge. It is also known to effect image transfer from a photoreceptor onto a substrate backed by a charged roller. Unless the image is rigidized before it reaches the nip of the photoreceptor and the roller, image squash and flow may occur.

Figure 2:
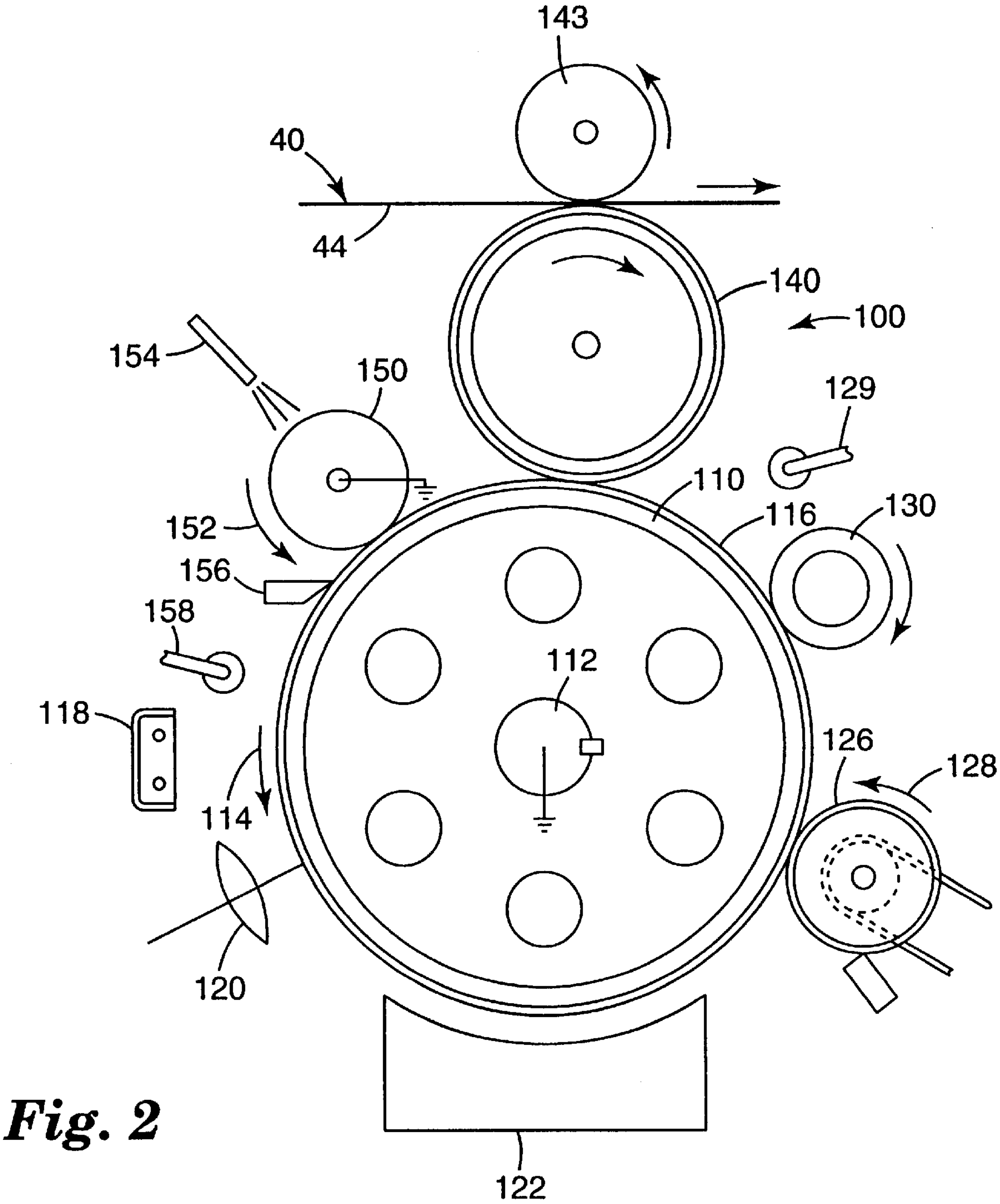
FIG. 2 is a partial schematic view of an electrophotographic imaging apparatus for use with the present invention.

FIG. 2 illustrates a preferred electrophotographic imaging apparatus 100 for use with the present invention. The apparatus is described for liquid developer systems with negatively charged toner particles, and negatively charged photoconductors, i.e., systems operating in the reversal mode. For other combinations of toner particle and photoconductor polarity, the values and polarities of the voltages are changed, in accordance with the principles of the invention.

As in conventional electrophotographic systems, the apparatus 100 of FIG. 2 typically comprises a drum 110 arranged for rotation about an axle 112 in a direction generally indicated by arrow 114. Drum 110 is formed with a cylindrical photoconductor surface 16.

A corona discharge device 118 is operative to generally uniformly charge photoconductor surface 116 with a negative charge. Continued rotation of drum 110 brings charged photoconductor surface 116 into image receiving relationship with an exposure unit including a lens 120, which focuses an image onto charged photoconductor surface 116, selectively discharging the photoconductor surface, thus producing an electrostatic latent image thereon. The latent image comprises image areas at a given range of potentials and background areas at a different potential. The image may be laser generated as in printing from a computer or it may be the image of an original as in a copier.

Continued rotation of drum 110 brings charged photoconductor surface 116, bearing the electrostatic latent image, into a development unit 122, which is operative to apply liquid developer, comprising a solids portion including pigmented toner particles and a liquid portion including carrier liquid, to develop the electrostatic latent image. The developed image includes image areas having pigmented toner particles thereon and background areas. Development unit 122 may be a single color developer of any conventional type, or may be a plurality of single color developers for the production of full color images as is known in the art. Alternatively, full color images may be produced by changing the liquid toner in the development unit when the color to be printed is changed. Alternatively, highlight color development may be employed, as is known in the art.

In accordance with a preferred embodiment of the invention, following application of toner thereto, photoconductor surface 116 passes a typically charged rotating roller 126, preferably rotating in a direction indicated by an arrow 128. Typically, the spatial separation of the roller 126 from the photoconductor surface 116 is about 50 microns. Roller 126 thus acts as a metering roller as is known in the art, reducing the amount of carrier liquid on the background areas and reducing the amount of liquid overlaying the image. Preferably the potential on roller 126 is intermediate that of the latent image areas and of the background areas on the photoconductor surface. Typical approximate voltages are: roller 126: 500 V, background area: 1000 V and latent image areas: 150 V. The liquid toner image which passes roller 126 should be relatively free of pigmented particles except in the region of the latent image.

Downstream of roller 126 there is preferably provided a rigidizing roller 130. Rigidizing roller 130 is preferably formed of resilient polymeric material, such as polyurethane which may have only its natural conductivity or which may be filled with carbon black to increase its conductivity. According to one embodiment of the invention, roller 130 is urged against photoconductor surface 116 as by a spring mounting (not shown). The surface of roller 130 typically moves in the same direction and with the same velocity as the photoconductor surface to remove liquid from the image.

Preferably, the biased squeegee described in U.S. Pat. No. 4,286,039, "Method and Apparatus for Removing Excess Developing Liquid From Photoconductive Surfaces" (Landa et al.), the entire disclosure of which is incorporated herein by reference, is used as the roller 130. Roller 130 is biased to a potential of at least several hundred and up to several thousand Volts with respect to the potential of the developed image on photoconductor surface 116, so that it repels the charged pigmented particles and causes them to more closely approach the image areas of photoconductor surface 116, thus compacting and rigidizing the image.

In a preferred embodiment of the invention, rigidizing roller 130 comprises an aluminum core having a 20 mm diameter, coated with a 4 mm thick carbon-filled polyurethane coating having a Shore A hardness of about 30–35, and a volume resistivity of about $10^8$ ohm-cm. Preferably roller 130 is urged against photoconductor surface 116 with a pressure of about 40–70 grams per linear cm of contact, which extends along the length of the drum. The core of rigidizing roller 130 is energized to between about 1800 and 2800 volts, to provide a voltage difference of preferably between about 1600 and 2700 volts between the core and the photoconductor surface in the image areas. Voltage differences of as low as 600 volts are also useful.

After rigidization under these conditions and for the preferred toner, the solids percentage in the image portion is believed to be as high as 35% or more, when carrier liquid absorbed as plasticizer is considered as part of the solids portion. It is preferable to have an image with at least 25–30% solids, after rigidizing. When the solids percentage is calculated on a non-volatile solids basis, the solids percentage is preferably above 20% and is usually less than 30%. Values of 25% have been found to be especially useful. At these concentrations the material has a paste like consistency.

Alternatively, the carbon filled polyurethane can be replaced by unfilled polyurethane with a volume resistivity of about $3\times10^{10}$, and the voltage is adjusted to give proper rigidizing.

Downstream of rigidizing roller 130 there is preferably provided a plurality of light emitting diodes (LEDs) 129 to discharge the photoconductor surface, and equalize the potential between image and background areas. For process color systems, where yellow, magenta and cyan toners are used, both red and green LEDs are provided to discharge the areas of the photoconductor behind the developed image as well as the background areas.

Downstream of LEDs 129 there is provided an intermediate transfer member 140, which rotates in a direction opposite to that of photoconductor surface 116, as shown by arrow 141. The intermediate transfer member is operative for receiving the toner image from the photoconductor surface and for subsequently transferring the toner image to a the imaging medium 40.

Various types of intermediate transfer members are known and are described, for example, in U.S. Pat. No. 4,684,238, "Intermediate Transfer Apparatus" (Till et al.) and U.S. Pat. No. 5,028,964, "Imaging System With Rigidizer And Intermediate Transfer Member" (Landa et al.) the entire disclosures of both of which are incorporated herein by reference.

In general, intermediate transfer member 140 is urged against photoconductor surface 116. One of the effects of the rigidization described above is to prevent substantial squash or other distortion of the image caused by the pressure resulting from the urging. The rigidization effect is especially pronounced due to the sharp increase of viscosity with concentration for the preferred toner.

Transfer of the image to intermediate transfer member is preferably aided by providing electrical bias to the intermediate transfer member 140 to attract the charged toner thereto, although other methods known in the art may be employed. Subsequent transfer of the image to imaging surface 44 of receptor layer 42, respectively, on the imaging medium is preferably aided by heat and pressure, with pressure applied by a backing roller 143, although other methods known in the art may be employed.

Following transfer of the toner image to the intermediate transfer member, photoconductor surface 116 is engaged by a cleaning roller 150, which typically rotates in a direction indicated by an arrow 152, such that its surface moves in a direction opposite to the movement of adjacent photoconductor surface 116 which it operatively engages. Cleaning roller 150 is operative to scrub and clean surface 116. A cleaning material, such as toner, may be supplied to the cleaning roller 150, via a conduit 154. A wiper blade 156 completes the cleaning of the photoconductor surface. Any residual charge left on photoconductor surface 116 is removed by flooding the photoconductor surface with light from a lamp 158.

In a multi-color system, subsequent to completion of the cycle for one color, the cycle is sequentially repeated for other colors which are sequentially transferred from photoconductor surface 116 to intermediate transfer member 140. The single color images may be sequentially transferred to the imaging medium 40 in alignment, or may alternatively be overlaid on the intermediate transfer member 140 and transferred as a group to the imaging medium.

Details of the construction of the surface layers of preferred intermediate transfer members are shown in U.S. Pat. No. 5,089,856, "Image Transfer Apparatus Incorporating An Integral Heater" (Landa et al.), the entire disclosure of which is incorporated herein by reference. Generally, the image is heated on intermediate transfer member 140 in order to facilitate its transfer to imaging medium 40. This heating is preferably to a temperature above a threshold temperature of substantial solvation of the carrier liquid in the toner particles.

As seen in FIG. 3, when the image is heated, the state of the image, i.e. of the polymer portion of the toner particles and the carrier liquid, depends on several factors, mainly on the temperature of the intermediate transfer member and on the concentration of toner particles. Thus, if the percentage of toner particles is "A" and the intermediate transfer member temperature is "Y" the liquid image separates into two phases, one phase being substantially a liquid polymer/carrier-liquid phase and the other phase consisting mainly of carrier liquid. On the other hand, if the percentage of toner particles is "B" at the same temperature, then substantially only one phase, a liquid polymer/carrier-liquid phase will be present. It is believed to be preferable that separate liquid polymer/carrier-liquid and liquid phases do not form to any substantial degree, as will be the case for example if the concentration is "C".

This type of phase separation is believed to be undesirable on the intermediate transfer member 140. It is believed that an absence of substantial phase separation of this type in the image on the intermediate transfer member results in improved image quality, including an improvement in line uniformity.

It is understood that heating the image on the intermediate transfer member 140 is not meant to completely dry the image, although some evaporation of carrier liquid may result. Rather, the image on the intermediate transfer member remains a viscous liquid until its transfer to the final substrate.

Other methods of concentrating the image than those just described, i.e., compacting the solids portion thereof and removing liquid therefrom, can be utilized provided they concentrate the image to the extent required. These methods include the use of separate solids portion compactors and liquid removal means, such as those described in U.S. Pat. No. 5,028,964, previously incorporated herein by reference. Alternatively the apparatus may utilize a solids portion compactor followed by an intermediate transfer member urged against the photoconductor to remove liquid from the image. As a further alternative, the commutated intermediate transfer member described in the '964 patent may be used to provide both solids portion compacting and liquid removal, just prior to transfer to the intermediate transfer member. Furthermore the concentrating step may take place on the intermediate transfer member after transfer of the liquid toner image thereto and before heating the image.

The receptor layers of the present invention provide a superior bond to the toners described herein when applied by electrophotographic printing methods just described. This is believed to result from the chemical compatibility between the toner's carrier resin and the receptor layer. Without desiring to be bound by any particular theory, it is presently believed that the thermoplastic toners described herein have a solubility parameter that is a close match to that of the receptor layer. This indicates a chemical compatibility between the receptor layer and the toner polymer resulting in a strong bond between the toner and the receptor layer.

The imaging media of the present invention are particularly durable and abrasion resistant in addition to being readily printable by the short run methods described herein.

The method of the present invention employing a dry toner can, for example, employ a copy machine such as Hewlett Packard Laser Jet copy machine available from Hewlett Packard or a Lanier 6540 copier available from Lanier Worldwide, Inc.

Uses

The imaging media of the present invention are well suited for use as labels, tags, tickets, signs, data cards, name plates, graphic overlays, and packaging films, for example, although the uses of the imaging media of the present invention are not thereby limited.

Properties

The imaging medium of the present invention typically has a T-Peel adhesion value of at least about 32 oz/in (358 g/cm), preferably at least about 60 oz/in (671 g/cm), and most preferably at least about 80 oz/in (894 g/cm).

The imaged medium of the present invention typically has a print quality value of at least about fair, preferably at least about fair/good, and most preferably at least about good, when printed by either or both the Xeikon and Indigo printing methods such as those described later herein.

The imaged medium of the present invention typically has a Taber abrasion resistance value of at least about 6 (most typically at least 6), preferably at least about 7, and most preferably at least 8 when printed by either or both the Xeikon and Indigo printing methods such as those described later herein (as well as other electrophotographic printing methods)

The above described properties can, for example, be measured on an image which is produced by a four-color process (yellow, magenta, cyan, black). Such a four-color process was used according to the test methods and examples below.

TEST METHODS

The following test methods are utilized herein.

Taber Abrasion Resistance Test

The following abrasion test was used herein. A modified version of ASTM Test method Designation: D 4060-81, Standard Test Method for ABRASION RESISTANCE OF ORGANIC COATINGS BY THE TABER ABRASER, was used (pp. 918–920 of the 1982 ANNUAL BOOK OF ASTM STANDARDS, Part 27, ASTM, Philadelphia, Pa., U.S.A.) incorporated by reference herein. The following machine was used: a Taber Abraser Model 503 (Standard Abrasion Tester) by Teledyne Taber, Tonawanda, N.Y. The apparatus used was such that the abrasive wheels used according to 5.2 were resilient calibrated wheels No. CS-10. With respect to 6.1, the specimens were 4 in. (108 mm) square with rounded corners and with a ¼ in. (6.3 mm) hole centrally located on each panel. With respect to 7.1 the load on the wheels was adjusted to 250 g. With respect to 7.3 the suction regulator was set to approximately 100% on the dial. According to 9.4 the specified number of cycles was 100. Sections 8, 10, 11, and 12 of the test were not employed.

A limitation is included in certain claims that an image electrophotographically formed by a liquid toner and/or an image formed by a dry toner on the receptor layer must have the indicated Taber abrasion resistance values. In order to test compliance with this requirement, one would provide an image on an imaging medium receptor layer with the Indigo printer and liquid toner as discussed in the Print Quality Section in order to test an image formed from a liquid toner. In order to test an image formed from a dry toner, one would use the Xeikon printer and dry toner discussed in the Print Quality Test in order to provide an image formed from a dry toner. Images thus provided could be tested for Taber abrasion resistance.

(Although it is desirable that the imaging medium of the invention having an image provided on its surface according to any of the methods and toners described herein have an acceptable Taber abrasion resistance value, this test method provides a convenient, consistent means of making such a determination.)

T-Peel Adhesion Test

T-peel adhesion of heat sealed samples was measured using two samples, each 4–5 inches (10.2–12.7 cm) down-web by 6 inches (15.2 cm) cross-web, cut from an imaging medium comprising a receptor layer and a backing. The two cut samples were placed receptor layer to receptor layer and put in a heat sealer (Model No. 12 AS, from Sentinel Machinery Packaging Industries, Montclair, N.J.) set at 300° F. (149° C.) with a pressure of 40 p.s.i. (19.5 g/cm$^2$) and a dwell time of 1 second. The resultant heat sealed sample was removed from the heat sealer and stored at about 73° F. (22.8° C.)/50% relative humidity for about 24 hours. Three strips, each 2.5 cm wide and 10.2 cm long, were cut from the heat sealed sample perpendicular to and across the sealed area to form a test sample of about 1 inch (2.54 cm) square with unsealed leaders on each edge. One leader of the test sample was clamped in the upper jaw of an INSTRON Tensile Tester (Model No. 1123) and the other leader was clamped in the lower jaw of the tensile tester. The test sample was separated at a rate of 12 inches (30.48 cm)/ minute.

Print Quality Test

Printing on the imaging medium was performed by either the Indigo press or the Xeikon press. The Indigo press utilized was a Scorpion model press available from Indigo. The Xeikon press utilized was a DCP-1 model press available from Xeikon. When the Indigo press was utilized, the imaging medium was web fed into the press at 200 steps using a blanket setup temperature of 140° C. The liquid toner used with the Indigo press was an ethylene vinyl acetate based toner known as ELECTROINK for E-PRINT 1000 manufactured by Indigo Ltd. of Rehovot, Israel. When the Xeikon press was utilized, the imaging medium was also web fed by using radiation heat to fuse the powder toner of the image at approximately 400° F. (204.4° C.) The dry powder toner used with the Xeikon press was a polyester toner available from Xeikon under the name Xeikon toner.

The print quality was assessed visually by holding the printed film at normal reading distance (about 12 inches [30.5 cm]) from the naked eye. "No Printing" indicates that no portion of an image was transferred from the blanket to the receptor; "Poor" indicates that less than about 50% of the image was transferred; "Fair" indicates that 50–80% of the image was transferred; "Fair/Good" indicates that greater than 80% but less than 95% of the image was transferred; and "Good" indicates that at least about 95% of the images was transferred.

EXAMPLES

The following examples are offered to aid in the understanding of the present invention and are not to be construed as limiting the scope thereof. Unless otherwise indicated, all parts and percentages are by weight. In the following examples, all images were direct printed, except for Examples 22–25 and Comparative Examples 26–27, which were reverse printed.

In the following examples in which the receptor layer was extruded onto a PC film backing, it was always extruded onto the gloss side of the PC film.

Comparative Examples 1–6

Various imaging media, each comprising a receptor layer and a PC backing, were prepared in Comparative Examples 1–6. The specific receptor layers used are indicated in TABLE I.

For Comparative Examples 1–2, films of each receptor layer material were independently heat sealed directly onto a 5 mil (0.13 mm) thick PC film (No. 8A35; from General Electric).

The receptor layer films of Comparative Examples 1a–1c were 2-layer composites of polyethylene terephthalate ("PET") and polyethylene; commercially available from Minnesota Mining and Manufacturing Company (3M Company) under the trademark SCOTCHPAK™. For Comparative Examples 1a–1c, samples of the SCOTCHPAK™ film were cut according to the T-peel Adhesion Test and were heat sealed onto the PC film with the polyethylene layer adjacent to the PC. Heat sealed samples of Comparative Examples 1a–1c were prepared as described in the T-Peel Adhesion Test with the PC film being placed on the bottom platen when being heat sealed. Strips cut from the heat sealed sample were tested as described in the T-Peel Adhesion Test.

For Comparative Examples 2a–2b, polymers making up the receptor layer were independently melted and extruded at 3 mil (0.075 mm) thickness. The extruder temperature profile was: zone 1=200° F. (93° C.); zone 2=350° F. (177° C.); zone 3=500° F. (260° C.). The die temperature was 500° F. (260° C.). Samples of the resultant films were cut and heat sealed to No. 8A35 PC film as described in the T-Peel Adhesion Test. When the cut samples were placed in the heat sealer, the PC film was on the top. Strips cut from the heat sealed samples of Comparative Examples 2a–2b were tested as described in the T-Peel Adhesion Test.

For Comparative Example 2c, the receptor layer film as obtained from the manufacturer was heat sealed directly to the PC film. The PC film was on the top when heat sealed. Samples were cut, heat-sealed and strips measured for adhesion using the T-Peel Adhesion Test.

For Comparative Examples 1d, 1e and 3–6, the receptor layer polymers were independently melted and extruded at 1.5 mil (0.038 mm) coating thickness onto 0.56 mil (0.014 mm) PET film and UV irradiated at 280° F. (138° C.). The UV light power was 157 watts/cm, the web speed was about 10 meters/minute, and the distance of the UV light source was about 5.1 cm from the receptor layer. Samples of the receptor layer/PET composite were cut and heat sealed to PC film according to the T-Peel Adhesion Test. For these examples, the PC film was on the bottom when heat sealed.

The T-Peel Adhesion Test results (in g/cm) reported in TABLE I are the average of three independent determinations. "Poor" indicates that the adhesion of the receptor layer to the backing was so weak that it could not be measured by the tensile tester or that the receptor layer had delaminated from the backing.

Print quality was assessed using the Print Quality Test.

The data in TABLE I show that adhesion of the receptor layer to the PC film backing was poor for all polymers tested, except for the polymer of Comparative Example 6. All samples were run on the Indigo press with the print quality visually assessed and reported in TABLE I.

TABLE I

| COMP. EX. | Receptor Layer | Adhesion to PC g/cm) | Indigo Print Quality |
|---|---|---|---|
| | Polyethylene | | |
| 1a | SP-107 (MDPE)[1] | Poor | Poor |
| 1b | SP-132 (LDPE)[2] | Poor | Poor |
| 1c | SP-241 (LLDPE)[3] | Poor | Fair |
| 1d | EXACT 3027[4] | Poor | Poor |
| 1e | EXACT 3031[5] | Poor | Poor |
| | Polypropylenes | | |
| 2a | Exxon PP1024 (Isotactic)[6] | Poor | Poor |
| 2b | Fina EOD-04 (Syndiotactic)[7] | Poor | Poor |
| 2c | TESLIN (7 mil porous film)[8] | Poor | Good |
| | Ionomer | | |
| 3 | SURLYN 1705 (Zn)[9] | Poor | Good |
| | Ethylene Acrylic Acid Copolymer | | |
| 4 | NUCREL 3990[10] | Poor | Good |
| | Anhydride Modified Polyethylenes | | |
| 5a | BYNEL E-388[11] | Poor | Poor |
| 5b | BYNEL 4105[12] | Poor | Fair |
| | Ketone Containing Copolymer | | |
| 6 | ELVALOY HP551[13] | 894.4 | Poor |

[1]Medium Density Polyethylene available from 3M (1.5 mil (0.038 mm) medium density polyethylene film on a 0.56 mil (0.014 mm) PET film).
[2]Low Density Polyethylene available from 3M (2.0 mil (0.05 mm) low density polyethylene film on a 0.56 mil (0.014 mm) PET film).
[3]Linear Low Density Polyethylene available from 3M (3.5 mil (0.09 mm) linear low density polyethylene film on a 0.56 mil (0.014 mm) PET film).
[4]Ethylene/butene copolymer; MI of about 3.5 g/10 min.; density of 0.900 g/cc; available from Exxon.

TABLE I-continued

| COMP. EX. | Receptor Layer | Adhesion to PC g/cm) | Indigo Print Quality |
|---|---|---|---|

[5]Ethylene/hexene copolymer; MI of about 3.5 g/10 min.; density of 0.900 g/cc; available from Exxon.
[6]Isotactic polypropylene; available from Exxon; Melt Flow Rate of 13.0.
[7]Syndiotactic polypropylene; available from Fina; Melt Flow Rate of 5.1.
[8]7.0 mil thick polypropylene; available from PPG, Ohio.
[9]Neutralized ethylene-co-methacrylic acid ionomeric polymer; about 3% acid neutralized with zinc cation; MI of about 5.5 g/10 min.; about 12% acid content; available from duPont.
[10]Ethylene acrylic acid copolymer; MI of about 10.5 g/10 min.; acrylic acid content of about 9.0%; available from duPont.
[11]Anhydride modified LDPE; MI of about 5.3 g/10 min.; available from duPont.
[12]Anhydride modified LLDPE; MI of about 4.0 g/10 min.; available from duPont.
[13]EVA ketone containing copolymer with VA content of about 30% and carbon monoxide content of about 10%; available from duPont.

Comparative Examples 7–9 and Examples 10–21

An imaging medium comprising a single receptor layer and a PC backing was prepared using the resin(s) set out in TABLE II as the respective receptor layers. For Comp. Ex. Nos. 7–9 and Ex. Nos. 10–16, pellets of the resin indicated were melted and extruded at a 1.5 mil (0.038 mm) coating thickness onto a PC film backing used for Comparative Examples 1–6. For Ex. Nos. 17–21, pellets of the two resins were mixed by dry blending. The blended resins were melted and extruded onto the PC film backing. For Comparative Examples 7–9 and Examples 10–21, the extruder temperature profile was: zone 1=200° F. (93° C.); zone 2=300° F. (149° C.); zone 3=400° F. (205° C.). The die temperature was 400° F. (205° C.).

Adhesion to the PC film backing was measured using the procedure detailed in the T-Peel Adhesion Test and the print quality of samples imaged with both the Indigo press and the Xeikon press was assessed as described in Comparative Examples 1–6. Taber abrasion resistance was measured on imaged samples using the Taber Abrasion Resistance Test.

The data in TABLE II show that Examples 10–21 of the present invention all demonstrate good adhesion of the receptor layer to the PC backing as well as Fair-Good (for Ex. No. 10) or Good (for Ex. Nos. 11–21) print quality with an Indigo and/or Xeikon printing process. Taber abrasion resistance was good for all samples evaluated.

TABLE II

| EX. No. | Receptor Layer | Adhesion to PC (g/cm) | Indigo Print Quality | Indigo Printing/ TAR* | Xeikon Print Quality |
|---|---|---|---|---|---|
| | EVA | | | | |
| COMP. 7 | ELVAX 750[1] | 179 | Poor | — | Poor |
| COMP. 8 | ELVAX 650[2] | 299.6 | Fair | — | Fair |
| 10 | ELVAX 450[3] | 508.7 | Fair–Good | 6.5 | Fair–Good |
| 11 | ELVAX 260[4] | 1045.3 | Good | 8.5 | Good |
| 12 | ELVAX 220[5] | 1073.3 | Good | 7.0 | Good |
| | Ethylene Vinyl Acrylates | | | | |
| 13 | SP-2207(EMAC)[6] | 1224.2 | Good | 7.5–8.0 | — |
| COMP. 9 | SP-2242[7] | 290.7 | Fair–Good | 6.0 | — |

TABLE II-continued

| EX. No. | Receptor Layer | Adhesion to PC (g/cm) | Indigo Print Quality | Indigo Printing/ TAR* | Xeikon Print Quality |
|---|---|---|---|---|---|
| | Acid/Anhydride Modified EVA/Ethylene Vinyl Acrylate | | | | |
| 14 | BYNEL CXA 1123[8] | 1073.3 | Good | 7.5 | Good |
| 15 | BYNEL E-214[9] | 1067.7 | Good | 7.0 | — |
| 16 | BYNEL E-369[10] | 682.0 | Good | 6.5 | — |
| | Blends | | | | |
| 17 | 15% BYNEL CXA 2002[11]: 85% ELVAX 265[12] | 1788.8 | Good | 7.5 | Good |
| 18 | 15% BYNEL CXA 2002: 85% ELVAX 3175[13] | 1788.8 | Good | 8.5 | — |
| 19 | 45% BYNEL CXA 2002: 55% ELVAX 3175 | 1486.9 | Good | 7.5 | — |
| 20 | 30% BYNEL CXA 2002: 70% BYNEL CXA 1123 | 1688.2 | Good | 7.5 | — |
| 21 | 45% BYNEL CXA 2002: 55% BYNEL CXA 1123 | 1598.7 | Good | 8.0 | — |

*Taber Abrasion Resistance.
[1]Ethylene vinyl acetate ("EVA") copolymer with vinyl acetate ("VA") content of about 9% and MI of about 7.0 g/10 min.; available from duPont.
[2]EVA copolymer with VA content of about 12% and MI of about 8.0 g/10 min.; available from duPont.
[3]EVA copolymer with VA content of about 18% and MI of about 8.0 g/10 min.; available from duPont.
[4]EVA copolymer with VA content of about 28% and MI of about 6.0 g/10 min.; available from duPont.
[5]EVA copolymer with VA content of about 28% and MI of about 150 g/10 min.; available from duPont.
[6]Ethylene methyl acrylate with methyl acrylate content of about 20%; MI of about 6.0 g/10 min.; available from Chevron Chemical Company, Orange, TX.
[7]Ethylene methyl acrylate with methyl acrlate content of about 20%; MI of about 3.5 g/10 min.; contains slip agent; available from Chevron Chemical Company, Orange, TX.
[8]Acrylic acid modified EVA with MI of about 6.6 g/10 min.; available from duPont.
[9]Methacrylic acid modified EVA with MI of about 7.9 g/10 min.; available from duPont.
[10]Anhydride modified ethylene acrylate; MI of about 6.5 g/10 min.; available from duPont.
[11]Acid modified ethylene acrylate; MI of about 10.0 g/10 min.; available from duPont.
[12]EVA copolymer with VA content of about 28% and MI of about 3.0 g/10 min.; available from duPont.
[13]EVA copolymer with VA content of about 28% and MI of about 6.0 g/10 min.; available from duPont.

Examples 22–25 and Comparative Examples 26–27

Imaging media comprising a receptor layer and a PC backing (used for Comparative Examples 1–6) were prepared using the resins, ELVAX 3175 and BYNEL 2002, and a UV light inhibitor (Sanduvar 3051; from Clariant Corporation, Charlotte, N.C.), UV light absorber (Cyasorb UV-5411; from Cytec Industries Inc., Stanford, Conn.) and antioxidant (Sandostab P-EPQ; from Clariant Corporation, Charlotte, N.C.). For each example in TABLE III, pellets of the resins and the additives were dry blended, melted and extruded at 1.5 mil (0.038 mm) coating thickness onto the PC film backing. For all examples, the extruder temperature profile and the die temperature were as described for Comparative Examples 7–9 and Examples 10–21.

The color stability of reverse image printed samples was evaluated by measuring in reflection the L*, a* and b* color coordinates of the samples. The color coordinates were obtained by the CIELAB (CIE 1978) color determination methods described in Billmeyer & Saltzman, *Principles of Color Technology*, 2nd Ed., pp 62–65 (1981), incorporated by reference herein.

Fifty samples of each Ex. No. were reverse image printed using the Indigo press. Two imaged samples of each example were evaluated to determine the initial sample's a* (red) color value using a Spectro Sensor II calorimeter; from ACS Applied Color Systems, Charlotte, N.C.).

Two samples of each example were aged for 93 hours using the UV Accelerated Aging Test with Xenox Light exposure and the Atlas Electric Devices A-3, C165/XW from Chicago Ill. After 93 hours of accelerated aging, the samples were evaluated to determine the a* color value using the Spectro Sensor II colorimeter. The percent red (i.e., magenta) color retention was calculated using the formula:

$$\frac{\text{Final } a^* \text{ Value}}{\text{Initial } a^* \text{ Value}} \times 100 = \%\ a^* \text{ Value after Aging}$$

Set out in TABLE III are the amounts of UV light inhibitor and UV light absorber for receptor layers each containing 82% ELVAX 3175, 18% BYNEL 2002 and 0.15% antioxidant. All the values in TABLE III are in weight percent. The a* Value represents the red color remaining after aging. The data in TABLE III show the good red color retention of the imaged medium of the invention compared to Comparative Example 26 containing no UV light inhibitor and Comparative Example 27 containing neither UV inhibitor nor UV light absorber. The negative a* Values for Comp. Ex. Nos. 26–27 represent the fact that all the magenta color had disappeared. The composition of Example 24 with 0.75% UV inhibitor and 0.75% UV absorber exhibited particularly good magenta color retention.

TABLE III

| EX. No. | UV Inhibitor | UV Absorber | a* Value (%) |
|---|---|---|---|
| 22 | 1.5 | — | +71.7 |
| 23 | 1.0 | 0.5 | +51.5 |
| 24 | 0.75 | 0.75 | +86.2 |
| 25 | 0.5 | 1.0 | +79.1 |
| COMP. 26 | — | 1.5 | −14.8 |
| COMP. 27 | — | — | −10.4 |

The present invention has now been described with reference to several embodiments thereof. The foregoing detailed description has been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the exact details and structures described herein, but rather by the structures described by the language of the claims, and the equivalents of those structures.

What is claimed is:

1. An imaging medium comprising:

(a) a receptor layer, wherein the receptor layer comprises:

(I) a polymer(s) wherein each polymer independently comprises the polymerization product of a composition comprising (i) ethylene, (ii) monomer(s) selected from the group consisting of vinyl acetate, vinyl acrylate, and mixtures thereof, (iii) optionally a vinyl carboxylic acid(s), (iv) optionally an anhydride; and (II) 0 to about 3 percent by weight of an ultraviolet light stabilizer selected from the group consisting of ultraviolet light absorbers, ultraviolet light inhibitors, and mixtures thereof, based upon the total weight of the receptor layer;

wherein the receptor layer has a melt index of at least about 2.5 grams/10 minutes; and (b) a polycarbonate backing layer bonded to the receptor layer;

wherein the receptor layer is bonded to the backing layer in the substantial absence of ultraviolet radiation, and wherein the composition of the receptor layer is selected such that the T-peel adhesion of the receptor layer to the polycarbonate backing layer is at least about 358 g/cm, and such that at least one of the following is true:

(i) the Taber abrasion resistance test value for an image electrophotographically formed on the receptor layer with a liquid toner is at least about 6;

(ii) the Taber abrasion resistance test value for an image electrophotographically formed on the receptor layer with a dry thermoplastic toner is at least about 6.

2. The imaging medium of claim 1 wherein the ultraviolet light absorbers are selected from the group consisting of benzotriazoles, benzophenones, oxalanilides, triazines, and mixtures thereof, and the ultraviolet light inhibitors are selected from the group consisting of hindered amines.

3. The imaging medium of claim 1 wherein both ultraviolet light absorber and ultraviolet light inhibitor are present in the receptor layer at a weight ratio of ultraviolet light absorber to ultraviolet light inhibitor of about 1:3 to about 3:1.

4. The imaging medium of claim 1 wherein both ultraviolet light absorber and ultraviolet light inhibitor are present in the receptor layer at a weight ratio of ultraviolet light absorber to ultraviolet light inhibitor of about 1.5:2.5 to about 2.5:1.5.

5. The imaging medium of claim 1 wherein the receptor layer comprises about 0.1 to about 3 percent by weight of a component selected from the group consisting of ultraviolet light absorber, ultraviolet light inhibitor, and mixtures thereof, based on the total weight of the receptor layer.

6. The imaging medium of claim 1 wherein the receptor layer comprises about 0.3 to about 1.5 percent by weight of a component selected from the group consisting of ultraviolet light absorber, ultraviolet light inhibitor, and mixtures thereof, based on the total weight of the receptor layer.

7. The imaging medium of claim 1 wherein the receptor layer comprises about 0.5 to about 1 percent by weight of a component selected from the group consisting of ultraviolet light absorber, ultraviolet light inhibitor, and mixtures thereof, based on the total weight of the receptor layer.

8. The imaging medium of claim 1 wherein at least one of the following is true:

(i) the Taber abrasion resistance test value for an image electrophotographically formed on the receptor layer with a liquid toner is at least about 7;

(ii) the Taber abrasion resistance test value for an image electrophotographically formed on the receptor layer with a dry thermoplastic toner is at least about 7.

9. The imaging medium of claim 1 at least one of the following is true:

(i) the Taber abrasion resistance test value for an image electrophotographically formed on the receptor layer with a liquid toner is at least about 8;

(ii) the Taber abrasion resistance test value for an image electrophotographically formed on the receptor layer with a dry thermoplastic toner is at least about 8.

10. The imaging medium of claim 1 wherein the T-peel adhesion value is at least about 671 g/cm.

11. The imaging medium of claim 1 wherein the T-peel adhesion value is at least about 894 g/cm.

12. The imaging medium of claim 1 wherein the polymer (s) are selected from the group consisting of:

ethylene/vinyl acetate copolymers, each ethylene/vinyl acetate copolymer independently comprising about 52 to about 85 percent by weight ethylene and about 15 to about 48 weight percent vinyl acetate, based upon the total weight of the ethylene/vinyl acetate copolymer;

ethylene/vinyl acrylate copolymers, each ethylene/vinyl acrylate copolymer independently comprising about 60 to about 90 percent by weight ethylene and about 10 to about 40 weight percent vinyl acrylate, based upon the total weight of the ethylene/vinyl acrylate copolymer;

ethylene/vinyl carboxylic acid/vinyl acetate copolymers, each ethylene/vinyl carboxylic acid/vinyl acetate copolymer independently comprising about 37 to about 89 percent by weight ethylene, about 1 to about 15 weight percent vinyl carboxylic acid, and about 10 to about 48 percent by weight vinyl acetate based upon the total weight of the ethylene/vinyl carboxylic acid/vinyl acetate copolymer;

ethylene/vinyl carboxylic acid/vinyl acrylate copolymers, each ethylene/vinyl carboxylic acid/vinyl acrylate copolymer independently comprising about 45 to about 89 percent by weight ethylene, about 1 to about 15 weight percent vinyl carboxylic acid, and about 10 to about 40 percent by weight vinyl acrylate based upon the total weight of the ethylene/vinyl carboxylic acid/vinyl acrylate copolymer;

ethylene/anhydride/vinyl acetate copolymers, each ethylene/anhydride/vinyl acetate copolymer independently comprising about 37 to about 89.9 percent by weight ethylene, about 0.1 to about 15 weight percent anhydride, and about 10 to about 48 percent by weight vinyl acetate based upon the total weight of the ethylene/anhydride/vinyl acetate copolymer;

ethylene/anhydride/vinyl acrylate copolymers, each ethylene/anhydride/vinyl acrylate copolymer independently comprising about 45 to about 94.9 percent by weight ethylene, about 0.1 to about 15 weight percent anhydride, and about 5 to about 40 percent by weight vinyl acrylate based upon the total weight of the ethylene/anhydride/vinyl acrylate copolymer; and mixtures thereof.

13. The imaging medium of claim 1 wherein the polymer (s) are selected from the group consisting of:

ethylene/vinyl acetate copolymers, each ethylene/vinyl acetate copolymer independently comprising about 60 to about 85 percent by weight ethylene and about 15 to about 40 weight percent vinyl acetate, based upon the total weight of the ethylene/vinyl acetate copolymer;

ethylene/vinyl acrylate copolymers, each ethylene/vinyl acrylate copolymer independently comprising about 70 to about 90 percent by weight ethylene and about 10 to about 30 weight percent vinyl acrylate, based upon the total weight of the ethylene/vinyl acrylate copolymer;

ethylene/vinyl carboxylic acid/vinyl acetate copolymers, each ethylene/vinyl carboxylic acid/vinyl acetate copolymer independently comprising about 48 to about 84 percent by weight ethylene, about 1 to about 12 weight percent vinyl carboxylic acid, and about 15 to about 40 percent by weight vinyl acetate based upon the total weight of the ethylene/vinyl carboxylic acid/ vinyl acetate copolymer;

ethylene/vinyl carboxylic acid/vinyl acrylate copolymers, each ethylene/vinyl carboxylic acid/vinyl acrylate copolymer independently comprising about 52 to about 89 percent by weight ethylene, about 1 to about 12 weight percent vinyl carboxylic acid, and about 10 to about 30 percent by weight vinyl acrylate based upon the total weight of the ethylene/vinyl carboxylic acid/ vinyl acrylate copolymer;

ethylene/anhydride/vinyl acetate copolymers, each ethylene/anhydride/vinyl acetate copolymer independently comprising about 42 to about 84.9 percent by weight ethylene, about 0.1 to about 12 weight percent anhydride, and about 15 to about 40 percent by weight vinyl acetate based upon the total weight of the ethylene/anhydride/vinyl acetate copolymer;

ethylene/anhydride/vinyl acrylate copolymers, each ethylene/anhydride/vinyl acrylate copolymer independently comprising about 52 to about 89.9 percent by weight ethylene, about 0.1 to about 12 weight percent anhydride, and about 10 to about 30 percent by weight vinyl acrylate based upon the total weight of the ethylene/anhydride/vinyl acrylate copolymer; and mixtures thereof.

14. The imaging medium of claim 1 wherein the polymer (s) are selected from the group consisting of:

ethylene/vinyl acetate copolymers, each ethylene/vinyl acetate copolymer independently comprising about 65 to about 82 percent by weight ethylene and about 18 to about 35 weight percent vinyl acetate, based upon the total weight of the ethylene/vinyl acetate copolymer;

ethylene/vinyl acrylate copolymers, each ethylene/vinyl acrylate copolymer independently comprising about 75 to about 85 percent by weight ethylene and about 15 to about 25 weight percent vinyl acrylate, based upon the total weight of the ethylene/vinyl acrylate copolymer;

ethylene/vinyl carboxylic acid/vinyl acetate copolymers, each ethylene/vinyl carboxylic acid/vinyl acetate copolymer independently comprising about 55 to about 81 percent by weight ethylene, about 1 to about 10 weight percent vinyl carboxylic acid, and about 18 to about 35 percent by weight vinyl acetate based upon the total weight of the ethylene/vinyl carboxylic acid/ vinyl acetate copolymer;

ethylene/vinyl carboxylic acid/vinyl acrylate copolymers, each ethylene/vinyl carboxylic acid/vinyl acrylate copolymer independently comprising about 65 to about 83 percent by weight ethylene, about 2 to about 10 weight percent vinyl carboxylic acid, and about 15 to about 25 percent by weight vinyl acrylate based upon the total weight of the ethylene/vinyl carboxylic acid/ vinyl acrylate copolymer;

ethylene/anhydride/vinyl acetate copolymers, each ethylene/anhydride/vinyl acetate copolymer independently comprising about 55 to about 81.5 percent by weight ethylene, about 0.5 to about 10 weight percent anhydride, and about 18 to about 35 percent by weight vinyl acetate based upon the total weight of the ethylene/anhydride/vinyl acetate copolymer;

ethylene/anhydride/vinyl acrylate copolymers, each ethylene/anhydride/vinyl acrylate copolymer independently comprising about 65 to about 84 percent by weight ethylene, about 1 to about 10 weight percent anhydride, and about 15 to about 25 percent by weight vinyl acrylate based upon the total weight of the ethylene/anhydride/vinyl acrylate copolymer; and mixtures thereof.

15. The imaging medium of claim 1 wherein the vinyl carboxylic acid is selected from the group consisting of acrylic acid, methacrylic acid, and mixtures thereof.

16. The imaging medium of claim 1 wherein the polymer (s) comprise methacrylic acid in an amount of at least about 1% by weight based upon the total weight of the polymer(s).

17. The imaging medium of claim 1 wherein the polymer (s) comprise an anhydride in an amount of at least about 0.1% by weight based upon the total weight of the polymer (s).

18. The imaging medium of claim 1 wherein the polymer (s) comprise methacrylic acid in an amount of at least about 2% by weight based upon the total weight of the polymer(s).

19. The imaging medium of claim 1 wherein the polymer (s) comprise the polymerization product of a composition comprising ethylene and vinyl acetate, the polymer(s) having a melt index of at least about 2.5 grams/10 minutes and a vinyl acetate content of from about 15 to about 40 percent by weight based upon the total weight of the polymer(s).

20. The imaging medium of claim 1 wherein the polymer (s) comprise the polymerization product of a composition comprising ethylene and vinyl acrylate, the polymer(s) having a melt index of at least about 2.5 grams/10 minutes and an acrylate content of from about 10 to about 30 percent by weight based upon the total weight of the polymer(s).

21. The imaging medium of claim 1 wherein the polymer (s) comprise the polymerization product of a composition comprising ethylene, vinyl acrylate, and methacrylic acid, the polymer(s) having a melt index of at least about 2.5 grams/10 minutes, wherein the vinyl acrylate content is about 10 to about 30 percent by weight and the acid content is about 1 to about 12 percent by weight based upon the total weight of the polymer(s).

22. The imaging medium of claim 1 wherein the vinyl acrylate monomer is selected from the group consisting of vinyl alkyl acrylates, vinyl alkacrylates, and mixtures thereof.

23. The imaging medium of claim 1 wherein the vinyl acrylate monomer is selected from the group consisting of vinyl methyl acrylate, vinyl ethyl acrylate, vinyl propyl acrylate, vinyl n-butyl acrylate, vinyl n-pentyl acrylate, vinyl n-hexyl acrylate, vinyl methacrylate, vinyl ethacrylate, vinyl propacrylate, vinyl butacrylate, vinyl pentacrylate, vinyl hexacrylate, and mixtures thereof.

24. The imaging medium of claim 1 wherein for the polymer(s) the vinyl acrylate monomer is selected from the group consisting of vinyl n-butyl acrylate, vinyl methyl acrylate, vinyl methacrylate, and mixtures thereof.

25. The imaging medium of claim 1 wherein the receptor layer has a thickness of about 0.0075 mm to about 0.25 mm.

26. The imaging medium of claim 1 wherein the receptor layer has a thickness of about 0.013 mm to about 0.13 mm.

27. The imaging medium of claim 1 wherein the receptor layer further comprises an additive copolymer selected from the group consisting of ethylene/vinyl carboxylic acid copolymers, ionomers of ethylene/vinyl carboxylic acid copolymers, and mixtures thereof in an amount of about 1 to about 35 percent by weight based on the total weight of the receptor layer.

28. A method comprising the step of using the imaging medium of claim 1 in an electrophotographic printing process.

29. The method of claim 28 in which an image is formed from a composition comprising a plurality of thermoplastic toner particles in a liquid carrier at a first temperature, wherein the liquid carrier is not a solvent for the particles at the first temperature and wherein the thermoplastic particles and the liquid carrier form substantially a single phase at or above a second temperature.

30. The method of claim 29 wherein the thermoplastic toner particles are selected from the group consisting of ethylene vinyl acrylate copolymers, ethylene vinyl acetate copolymers, ethylene acrylic acid copolymers, ionomers of ethylene acrylic acid copolymers, and mixtures thereof.

31. The method of claim 28 which utilizes a dry thermoplastic toner.

32. The method of claim 31 wherein the toner is selected from the group consisting of polyester and styrene acrylate copolymer.

33. A method of transferring an electrophotographically developed image from a photoconductor to an imaging medium, comprising the steps of:

(a) selectively providing desired portions of a photoconductor with a developed image, the image comprising a plurality of thermoplastic toner particles in a liquid carrier at a first temperature, wherein the liquid carrier is not a solvent for the particles at the first temperature and wherein the thermoplastic particles and the liquid carrier form substantially a single phase at or above a second temperature;

(b) heating the developed image to a temperature at least as high as the second temperature to thereby form a single phase of the thermoplastic particles and liquid carrier; and (c) thereafter transferring the developed image to the receptor layer of an imaging medium at a temperature of about 120° to about 165° C.;

wherein the imaging medium is that of claim 1.

34. The method of claim 33 wherein the thermoplastic toner particles are selected from the group consisting of ethylene vinyl acrylate copolymers, ethylene vinyl acetate copolymers, ethylene acrylic acid copolymers, ionomers of ethylene acrylic acid copolymers, and mixtures thereof.

35. A method of transferring an electrophotographically developed image from a photoconductor to an imaging medium comprising the steps of:

(a) selectively providing desired portions of a photoconductor with a developed image, the image comprising a plurality of dry thermoplastic toner particles wherein the dry thermoplastic toner particles are solid at a first temperature, but which soften or melt at or above a second temperature;

(b) transferring the developed image onto a receptor layer of an imaging medium, wherein the imaging medium is that of claim 1;

(c) heating and optionally applying pressure to the developed image such that it reaches a temperature at least as high as the second temperature to soften or melt the toner particles to form a final fixed image.

36. The method of claim 35 wherein the toner is selected from the group consisting of polyester and styrene acrylate copolymer.

37. An imaged medium comprising:

(a) the imaging medium of claim 1;

(b) an image on a surface of the receptor layer which is not bonded to the backing, wherein the image is formed from a composition comprising a plurality of thermoplastic toner particles in a liquid carrier at a first temperature, wherein the liquid carrier is not a solvent for the particles at the first temperature and wherein the thermoplastic particles and the liquid carrier form substantially a single phase at or above a second temperature.

38. The imaged medium of claim 37 wherein the thermoplastic toner particles are selected from the group consisting of ethylene vinyl acrylate copolymers, ethylene vinyl acetate copolymers, ethylene acrylic acid copolymers, ionomers of ethylene acrylic acid copolymers, and mixtures thereof.

39. An imaged medium comprising:

(a) the imaging medium of claim 1;

(b) an image on a surface of the receptor layer which is not bonded to the backing, wherein the image is formed from a dry thermoplastic toner.

40. The imaged medium of claim 39 wherein the toner is selected from the group consisting of polyester and styrene acrylate copolymer.

41. A method of making an imaging medium comprising the step of:

bonding a polycarbonate backing layer to a receptor layer in the substantial absence of ultraviolet light radiation, wherein the receptor layer comprises:

(I) a polymer(s) wherein each polymer independently comprises the polymerization product of a composition comprising (i) ethylene, (ii) monomer(s) selected from the group consisting of vinyl acetate, vinyl acrylate, and mixtures thereof, (iii) optionally a vinyl carboxylic acid(s), (iv) optionally an anhydride; and (II) 0 to about 3 percent by weight of a component selected from the group consisting of ultraviolet light absorbers, ultraviolet light inhibitors, and mixtures thereof, based upon the total weight of the receptor layer;

wherein the receptor layer has a melt index of at least about 2.5 grams/10 minutes; and wherein the composition of the receptor layer is selected such that the T-peel adhesion of the receptor layer to the polycarbonate backing layer is at least about 358 g/cm, and such that at least one of the following is true:

(i) the Taber abrasion resistance test value for an image formed on the receptor layer with a liquid toner is at least about 6;

(ii) the Taber abrasion resistance test value for an image formed on the receptor layer with a solid toner is at least about 6.

42. The method of claim 41 wherein the receptor layer further comprises an additive copolymer selected from the group consisting of ethylene/vinyl carboxylic acid copolymers, ionomers of ethylene/vinyl carboxylic acid copolymers, and mixtures thereof, in an amount of about 1 to about 35 percent by weight based on the total weight of the receptor layer.

43. The imaged medium of claim 37 or claim 39 which further comprises a layer of adhesive coated over a surface of the backing opposite the receptor layer and a release liner attached to a surface of the adhesive layer opposite the backing.

44. The imaged medium of claim 37 or claim 39 which further comprises a layer of adhesive coated over the image and the surface of the receptor layer not bonded to the backing.

45. The method of claim 41 wherein the receptor layer comprises about 0.05 to about 3 percent by weight of a component selected from the group consisting of ultraviolet light absorbers, ultraviolet light inhibitors, and mixtures thereof, based upon the total weight of the receptor layer.

46. The imaging medium made according to the method of claim 41.

47. The imaging medium made according to the method of claim 45.

* * * * *

UNITED STATES PATENT AND TRADEMARK OFFICE

CERTIFICATE OF CORRRECTION

PATENT NO. : 5,858,516
DATED : January 12, 1999
INVENTOR(S) : David T. Ou-Yang

It is certified that error appears in the above-identified patent and that said Letters Patent is hereby corrected as shown below:

On the title page, item [56] add the following:

U. S. PATENT DOCUMENTS

| EXAMINER INITIAL | | PATENT NUMBER | | | | | | | ISSUE DATE | PATENTEE | CLASS | SUBCLASS | FILING DATE IF APPROPRIATE |
|---|---|---|---|---|---|---|---|---|---|---|---|---|---|
| | 0 | 4 | 6 | 6 | 5 | 0 | 3 | A1 | 01/15/92 | EPO | | | |
| | DE | 24 | 54 | 47 | | | | | 05/15/75 | Germany | | | |
| | 0 | 684 | 337 | A2 | | | | | 11/29/1995 | EPO | | | |
| | | | | | | | | | | | | | |

OTHER DOCUMENTS (Including Authors, Title, Date, Pertinent Papers, etc.)

XP002033594, JP 57 161 753 A, Abstract, Derwent Publications Ltd., 10/05/82

Signed and Sealed this

Nineteenth Day of October, 1999

*Attest:*

Q. TODD DICKINSON

*Attesting Officer*

*Acting Commissioner of Patents and Trademarks*